(12) United States Patent
Lin et al.

(10) Patent No.: US 11,140,562 B2
(45) Date of Patent: Oct. 5, 2021

(54) ANTENNA BEAM MANAGEMENT FOR MULTI-CONNECTION COMMUNICATIONS

(71) Applicants: Yicheng Lin, Ottawa (CA); Usa Vilaipornsawai, Nepean (CA); Mohammadhadi Baligh, Ottawa (CA)

(72) Inventors: Yicheng Lin, Ottawa (CA); Usa Vilaipornsawai, Nepean (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 569 days.

(21) Appl. No.: 15/403,638

(22) Filed: Jan. 11, 2017

(65) Prior Publication Data
US 2018/0199212 A1 Jul. 12, 2018

(51) Int. Cl.
*H04B 7/06* (2006.01)
*H04W 16/28* (2009.01)
*H04B 7/08* (2006.01)
*H04B 7/005* (2006.01)

(52) U.S. Cl.
CPC ............ *H04W 16/28* (2013.01); *H04B 7/005* (2013.01); *H04B 7/0619* (2013.01); *H04B 7/0695* (2013.01); *H04B 7/088* (2013.01)

(58) Field of Classification Search
CPC .. H04B 7/0617; H04B 7/0695; H04B 7/0684; H04B 7/0689; H04B 7/0842; H04B 7/0868; H04L 5/0007; H04L 5/0023; H04L 5/0053; H04W 72/046; H04W 16/28
See application file for complete search history.

(56) References Cited

U.S. PATENT DOCUMENTS

| | | | |
|---|---|---|---|
| 2009/0005121 A1 | 1/2009 | Wong et al. | |
| 2013/0286960 A1* | 10/2013 | Li | H04W 72/042 370/329 |
| 2014/0011529 A1 | 1/2014 | Bergel et al. | |
| 2014/0307654 A1 | 10/2014 | Kim | |

(Continued)

FOREIGN PATENT DOCUMENTS

| | | |
|---|---|---|
| CN | 101689712 A | 3/2010 |
| CN | 102355285 A | 2/2012 |

(Continued)

OTHER PUBLICATIONS

Ericsson, Key Principles for Beam Management, 3GPP TSG-RAN WG1 #86, R1-167466, pp. 1-5, Aug. 22-26, 2016, Göteborg, Sweden.

(Continued)

*Primary Examiner* — Jae Y Lee
*Assistant Examiner* — Aixa A Guadalupe Cruz

(57) ABSTRACT

Antenna beam sweeping according to the present disclosure involves different communication devices that are within an interference range of each other transmitting beam sweeping signals using different communication resources. This allows a receiver to distinguish between beam sweeping signals that are received from different transmitters, and may facilitate antenna beam alignment in multi-connection scenarios. Beam indices could be used to identify antenna beams for antenna beam management, in control signaling between base stations and User Equipment (UE), for example. Beam tracking and other aspects of antenna beam management are also disclosed.

21 Claims, 11 Drawing Sheets

(56) References Cited

U.S. PATENT DOCUMENTS

| | | |
|---|---|---|
| 2016/0080046 A1 | 3/2016 | You |
| 2016/0150435 A1 | 5/2016 | Baek et al. |
| 2016/0219571 A1 | 7/2016 | Lin et al. |
| 2016/0323075 A1 | 11/2016 | Jeong et al. |
| 2016/0344464 A1 | 11/2016 | Kim |
| 2017/0111852 A1* | 4/2017 | Selen .................. H04W 48/16 |
| 2018/0048442 A1* | 2/2018 | Sang .................... H04L 5/0048 |
| 2018/0115994 A1* | 4/2018 | Islam .................. H04W 74/006 |
| 2018/0131425 A1* | 5/2018 | Li .......................... H04B 7/088 |
| 2019/0182798 A1* | 6/2019 | Beale .................. H04B 7/0634 |
| 2019/0319686 A1* | 10/2019 | Chen, IV ............ H04W 72/046 |
| 2021/0037397 A1* | 2/2021 | Guo ...................... H04W 16/28 |

FOREIGN PATENT DOCUMENTS

| | | |
|---|---|---|
| CN | 102405603 A | 4/2012 |
| CN | 104067538 A | 9/2014 |
| CN | 105122662 A | 12/2015 |
| CN | 105379140 A | 3/2016 |
| CN | 105828416 A | 8/2016 |
| EP | 2987251 A1 | 2/2016 |

OTHER PUBLICATIONS

Nokia, Alcatel-Lucent Shanghai Bell, Beam Management Procedures in Beam Based Access, 3GPP TSG-RAN WG1#86, R1-167286, Aug. 22-26, 2016, pp. 1-5. Gothenburg, Sweden.

Huawei; HiSilicon, Beam Management Procedure for NR MIMO, 3GPP TSG RAN WG1 Meeting #86, R1-166089, Aug. 22-26, 2016, pp. 1-6, Gothenburg, Sweden.

Huawei; HiSilicon, Access mechanism for beam based approach, 3GPP TSG RAN WG1 Meeting #86, R1-166088, Aug. 22-26, 2016, pp. 1-8, Gothenburg, Sweden.

3GPP TSG-RAN WG2 Meeting #94 R2-163443,"On beam sweeping and its implications",Nokia, Alcatel-Lucent Shanghai Bell, May 23, 2016, total 4 pages.

Sony: "Views on beam management for NR", 3GPP TSG RAN WG1 #87, R1-1611541, Reno,USA; server date Nov. 13, 2016; downloaded by EPO Nov. 14, 2016; XP051175518, 4 pages.

* cited by examiner

ANTENNA BEAM MANAGEMENT FOR MULTI-CONNECTION COMMUNICATIONS

FIELD

The present disclosure relates generally to wireless communications and, in particular, to management of antenna beams in multi-connection communications.

BACKGROUND

Some wireless communication systems, such as proposed 5G New Radio (NR) systems, support High Frequency (HF) communications using highly directional, narrow antenna beams. Determining antenna beam directions for establishing communications and subsequently maintaining communications using narrow antenna beams can be a challenge, especially in multi-connection scenarios in which a User Equipment (UE) has connections to multiple base stations or a base station has connections with multiple UEs.

SUMMARY

Antenna beam alignment in a multi-connection scenario could be more effective if a communication device that receives antenna beam sweeping signals is able to distinguish between beam sweeping signals that are received from different transmitters. For example, different communication devices could use different communication resources to transmit beam sweeping signals, and a receiving device may, based on the different communication resources, distinguish between beam sweeping signals that are received from the different communication devices.

According to an aspect of the present disclosure, a method involves determining a first communication resource that is to be used for transmission of a first beam sweeping signal by a first communication device. The first communication resource is different from a second communication resource for transmission of a second beam sweeping signal by a second communication device that is within an interference range of the first communication device. The method also involves transmitting the first beam sweeping signal from the first communication device using the first communication resource and a plurality of antenna beams that are oriented in a plurality of directions. The first communication device could be a base station or a UE.

Feedback to the first communication device is provided in some embodiments. The first communication device could monitor for receipt of an indication, from a third communication device that receives the first beam sweeping signal, of one direction of the plurality of directions from which the third communication device best received the first beam sweeping signal. The indication could be an explicit indication of the one direction, or an implicit indication from which the first communication device determines the one direction.

A method could also involve establishing a connection with the third communication device via an antenna beam of the plurality of antenna beams that is oriented in the one direction.

In an embodiment, the first communication device is a base station and the third communication device is a UE, and the method involves repeating the transmitting and monitoring to track movement of the UE. Another form of such beam tracking involves monitoring, at the base station, the plurality of antenna beams for receipt of a third beam tracking signal from the UE; and transmitting to the UE an indication of a further direction from which the base station best received the third beam tracking signal from the UE. The base station could transmit to the UE a signal to cause the UE to initiate a beam tracking procedure that involves transmitting the third beam tracking signal from the UE and monitoring at the UE for receipt of the indication of the further direction from the base station.

In an embodiment, the first communication resource and the second communication resource are part of a set of orthogonal communication resources. A set of communication resources that includes the first communication resource and the second communication resource could also or instead be a set of time division multiplexed communication resources, a set of frequency division multiplexed communication resources, or a set of code division multiplexed communication resources.

Another aspect of the present disclosure provides a method that involves receiving at a communication device, using a plurality of antenna beams that are oriented in a plurality of directions, a first beam sweeping signals from a first transmitting communication device in a first communication resource and a second beam sweeping signal from a second transmitting communication device in a second communication resource that is different from the first communication resource. The method also involves determining, based on the first communication resource, a first direction of the plurality of directions from which the first beam sweeping signal is best received from the first transmitting communication device, and determining, based on the second communication resource, a second direction of the plurality of directions from which the second beam sweeping signal is best received from the second transmitting communication device.

The method may also involve determining, based on the first communication resource, a first transmit direction in which the first beam sweeping signal was transmitted by the first transmitting communication device; determining, based on the second communication resource, a second transmit direction in which the second beam sweeping signal was transmitted by the second transmitting communication device; and transmitting an indication of the first transmit direction to the first transmitting communication device and an indication of the second transmit direction to the second transmitting communication device. The indications could be explicit indications of the first transmit direction and the second transmit direction or implicit indications from which the first transmitting communication device determines the first transmit direction and the second transmitting communication device determines the second transmit direction.

In an embodiment, the method provides for downlink beam sweeping, in which the communication device is a UE and the first and second transmitting communication devices are base stations. A third beam tracking signal could be transmitted from the UE using the plurality of antenna beams, and monitoring could then be performed at the UE for receipt of an indication, from a base station, of a further direction of the plurality of directions from which the base station best received the third beam tracking signal from the UE.

Monitoring could also be performed at the UE for receipt of a signal, from the base station, to cause the UE to initiate a beam sweeping procedure that involves transmitting the third beam tracking signal from the UE and monitoring for receipt of the indication of the further direction from the base station.

Antenna beam sweeping could involve both transmit-side operations and receive-side operations. According to a further aspect of the present disclosure, a method involves: determining different communication resources to be used for transmission of beam sweeping signals by a plurality of base stations that are within an interference range of each other in a communication network; transmitting the beam sweeping signals from the plurality of base stations using the different communication resources and a plurality of antenna beams, at each of the base stations, that are oriented in a first plurality of directions; monitoring, at a UE, a plurality of antenna beams that are oriented in a second plurality of directions for receipt of beam sweeping signals from the plurality of base stations in the different communication resources; and determining at the UE, for each of the base stations from which a beam sweeping signal is received and based on the different communication resources, one direction of the second plurality of directions from which the received beam sweeping signal is best received from the base station.

In an embodiment, the UE provides feedback to each of the base stations from which a beam sweeping signal is received, by determining at the UE, based on the different communication resources, a transmit direction in which the received beam sweeping signal was transmitted by the base station, and transmitting from the UE to the base station an explicit or implicit indication of the determined transmit direction.

According to a further aspect, a non-transitory processor-readable medium stores instructions which, when executed by one or more processors, cause the one or more processors to perform a method as disclosed herein.

Apparatus embodiments are also disclosed. For example, a communication device could include an antenna array, a transmitter operatively coupled to the antenna array; a receiver operatively coupled to the antenna array; and an antenna beam manager operatively coupled to the transmitter and to the receiver.

The transmitter could be configured to form a plurality of antenna beams that are oriented in a plurality of directions, and the antenna beam manager could be configured to: determine a first communication resource to be used for transmission of a first beam sweeping signal by the communication device, with the first communication resource being different from a second communication resource for transmission of a second beam sweeping signal by a second communication device that is within an interference range of the first communication device; and transmit the first beam sweeping signal via the transmitter using the first communication resource and the plurality of antenna beams.

In some embodiments, the antenna beam manager is further configured to monitor the receiver for receipt of an indication, from a third communication device that receives the first beam sweeping signal, of one direction of the plurality of directions from which the third communication device best received the first beam sweeping signal. The indication could be an explicit indication of the one direction or an implicit indication from which the communication device determines the one direction.

The receiver could be configured to form a plurality of receive antenna beams that are oriented in a plurality of receive directions, and the antenna beam manager could be configured to: receive, using the plurality of receive antenna beams, a first beam sweeping signal from a first transmitting communication device in a first communication resource and a second beam sweeping signal from a second transmitting communication device in a second communication resource that is different from the first communication resource; determine, based on the first communication resource, a first direction of the plurality of directions from which the first beam sweeping signal is best received from the first transmitting communication device; and determine, based on the second communication resource, a second direction of the plurality of directions from which the second beam sweeping signal is best received from the second transmitting communication device. The antenna beam manager could be further configured to: determine a first transmit direction in which the first beam sweeping signal was transmitted by the first transmitting communication device; determine, based on the second communication resource, a second transmit direction in which the second beam sweeping signal was transmitted by the second transmitting communication device; and transmit via the transmitter an explicit or implicit indication of the first transmit direction to the first transmitting communication device and an explicit or implicit indication of the second transmit direction to the second transmitting communication device.

A communication device as described above and elsewhere herein could be implemented as a base station or as a UE. An antenna beam manager at a base station and/or at a UE could be further configured to perform beam tracking to track movement of the UE.

Antenna beam management could involve antenna beam information such as beam indices and/or beam directions, and possibly other information such as UE identifiers, base station identifiers, and/or connection identifiers. A memory could be operatively coupled to an antenna beam manager, and the antenna beam manager could be further configured to store to the memory a beam index associated with any of the directions referenced above, and/or other information.

According to a further aspect, a communication network includes a plurality of base stations and one or more UEs.

In an embodiment, each of the base stations includes: a base station antenna array; a base station transmitter, operatively coupled to the base station antenna array, to form a plurality of base station antenna beams that are oriented in a first plurality of directions; a base station receiver operatively coupled to the base station antenna array; and a base station antenna beam manager, operatively coupled to the base station transmitter and to the base station receiver, to: determine a communication resource to be used for transmission of beam sweeping signals by the base station, the communication resource being different from communication resources for transmission of beam sweeping signals by other base stations that are within an interference range of the base station; and transmit the beam sweeping signal from the base station transmitter using the determined communication resource and the plurality of base station antenna beams.

Each UE could include: a UE antenna array; a UE transmitter, operatively coupled to the UE antenna array; a UE receiver operatively coupled to the UE antenna array, to form a plurality of UE antenna beams that are oriented in a second plurality of directions; and a UE antenna beam manager, operatively coupled to the UE transmitter and to the UE receiver, to: receive, using the plurality of UE antenna beams, a first beam sweeping signal from a first base station in a first communication resource and a second beam sweeping signal from a second base station in a second communication resource that is different from the first communication resource; determine, based on the first communication resource, a first direction of the second plurality of directions from which the first beam sweeping signal is best received from the first base station; and determine, based on the second communication resource, a second direction of the plurality of directions from which the second beam sweeping signal is best received from the second base station.

In such a communication network, the UE antenna beam manager could be further configured to: determine, based on the first communication resource, a first transmit direction in which the first beam sweeping signal was transmitted by the first base station; determine, based on the second communication resource, a second transmit direction in which the second beam sweeping signal was transmitted by the second base station; and transmit an explicit or implicit indication of the first transmit direction to the first base station and an explicit or implicit indication of the second transmit direction to the second base station.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

Figure 1:
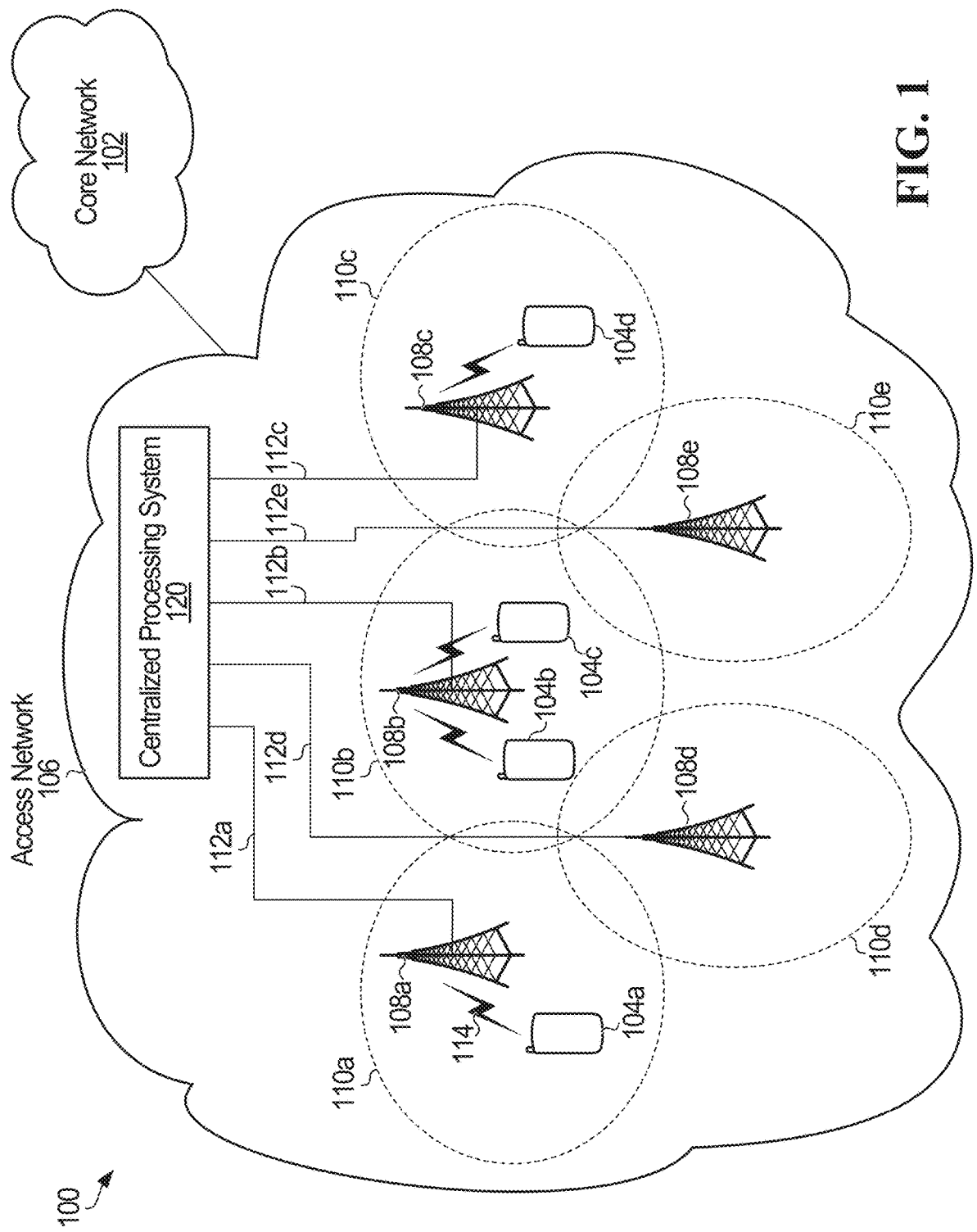
FIG. 1 is a block diagram illustrating a communication system.

FIG. 1 is a diagram illustrating a communication system. The communication system 100 includes a core network 102 and an access network 106.

The core network 102 may provide any of various services, such as call control/switching and gateways to other networks. The core network 102 includes network components such as routers, switches, and servers.

The access network 106 is a wireless communication network, and is connected or coupled to the core network 102. The base stations or nodes 108a, 108b, 108c, 108d, 108e provide wireless communication service within wireless coverage areas 110a, 110b, 110c, 110d, 110e. Each base station 108a-e may be implemented using a radio transceiver, one or more antennas, and associated processing circuitry, such as antenna radio frequency (RF) circuitry, analog-to-digital/digital-to-analog converters, etc. Transmit-Receive Points (TRPs), evolved NodeBs (eNBs), and other types of network nodes and network equipment are examples of the base stations 108a-e.

UEs 104a, 104b, 104c, 104d wirelessly access the communication system 100 using the access network 106. Each UE 104a-d includes a radio transmitter and a radio receiver which may be integrated into a radio transceiver, one or more antennas, and associated processing circuitry, such as antenna radio frequency (RF) circuitry, analog-to-digital/digital-to-analog converters, etc. The base stations 108-e and the UEs 104a-d may include similar types of components to support communications with each other in the communication system 100, but the actual implementations may be different. For example, the UEs 104a-d are portable between locations, whereas the base stations 108a-e are typically intended to be installed at a fixed location.

The base stations 108a-e are connected to a centralized processing system 120 in the access network 106, via communication links 112a, 112b, 112c, 112d, 112e. Each communication link 112a-e is an optical fibre communication link in one embodiment. Each base station 108a-e includes circuitry for transmitting data to the centralized processing system 120 and for receiving data from the centralized processing system via its communication link 112a-e. Although shown as a single centralized processing system in FIG. 1, the centralized processing system 120 may be implemented by a network of one or more processing and control servers. Alternatively, the centralized processing system 120 may be implemented as a single server.

The base stations 108a-e may serve as a gateway between wireline and wireless portions of the access network 106, although this need not be the case in embodiments in which the communication links 112a-e are wireless links. The base stations 108a-e may be placed at fixed locations by a network provider, for example, to provide a substantially continuous wireless coverage area. This is shown in FIG. 1 in that wireless coverage areas 110a-e overlap each other so that the UEs 104a-d may move throughout the wireless coverage areas and still be served by the access network 106.

Effects such as free space path loss, for example, may limit the range of HF wireless connections. Highly directional antenna beams may increase HF connection range, and could be used between any of the base stations 108a-e and any of the UEs 104a-d for which HF communications are to be supported. In NR, for example, highly directional antenna beams having a beam width with 10 degree half-power bandwidth could be used for HF communications at frequencies above 6 GHz. This beam width and HF range are provided solely as illustrative examples. The present disclosure is not limited to management of antenna beams in this example beam width range or to communications within this example HF range.

Antenna beam management as disclosed herein encompasses initial access to establish communications and subsequent actions to maintain communications. Initial access involves antenna beam sweeping to establish alignment of transmit (Tx) and receive (Rx) antenna beams for each connection. Beam sweeping could include coarse alignment, also referred to as initial beam training, using antenna beams that are wider than those that will be used for communications. After alignment of the Tx and Rx antenna beams is established, maintaining communications could involve such actions as antenna beam tracking or refinement to update and maintain alignment of antenna beam pairs as UEs move or wireless paths between UEs and base stations are affected by obstacles. Beam tracking after initial beam training, using narrower antenna beams for fine alignment, could also involve beam sweeping over a more limited sweeping range Embodiments of the present disclosure may be applicable to any of various multi-connection scenarios, between multiple base stations and/or multiple UEs. Initial antenna beam configuration, beam sweeping for initial beam training and beam tracking, beam management, and transmission control for multi-connection communications are disclosed.

Figure 2:
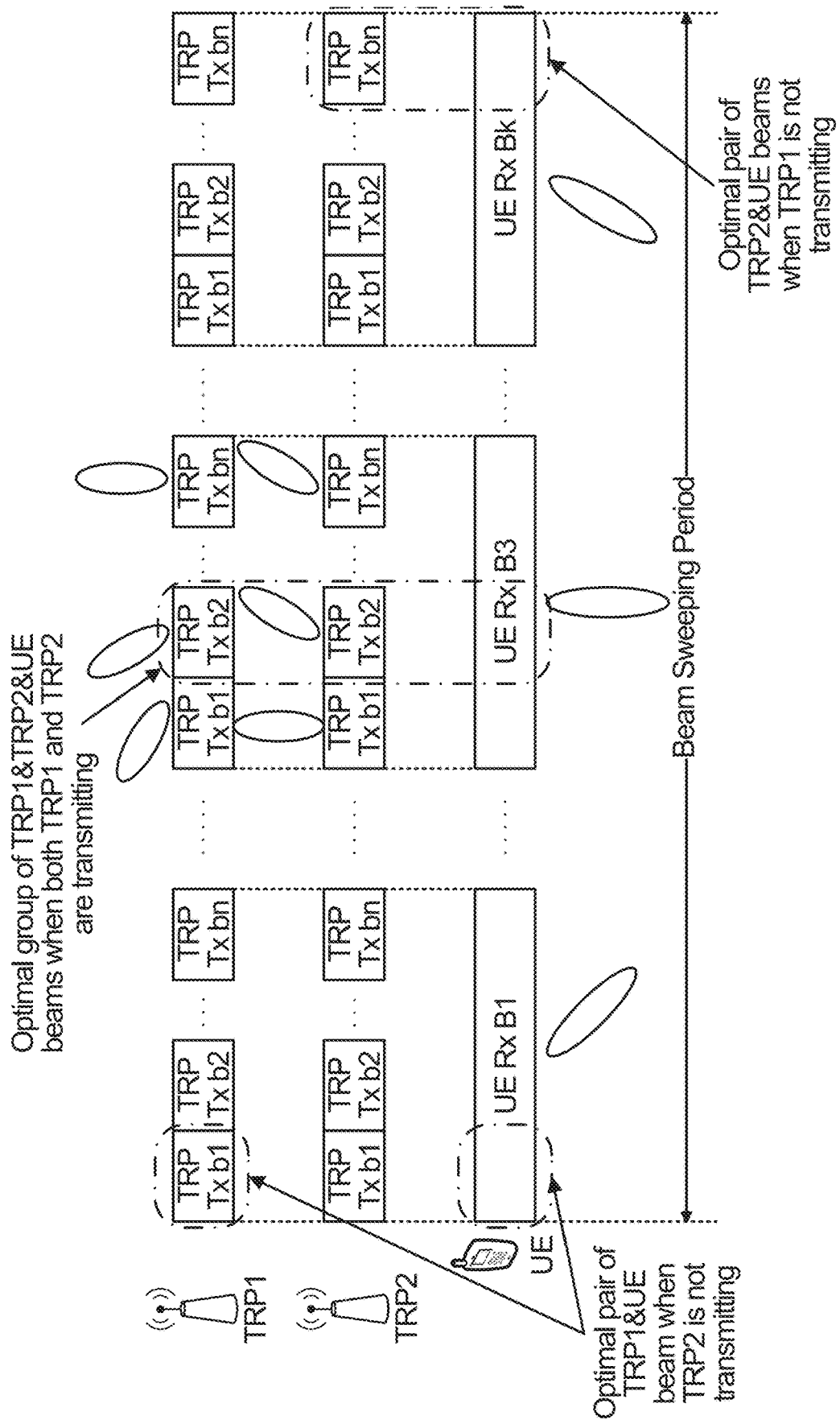
FIG. 2 is a block diagram illustrating downlink antenna beam sweeping.

FIG. 2 is a block diagram illustrating downlink antenna beam sweeping. In an embodiment, downlink antenna beam alignment involves transmission of a beam sweeping signal by each base station. In FIG. 2 two TRPs, TRP1 and TRP2, are shown as examples of base stations. Each TRP may transmit a synchronization signal, for example. A synchronization signal is an example of a beam sweeping signal that enables a UE to establish a connection with a base station and thereby gain access to a communication network. In another example, a beam reference signal instead of a synchronization signal could be transmitted during beam sweeping.

In the example shown in FIG. 2, downlink beam sweeping involves the TRPs transmitting the same beam sweeping signal using n antenna beams that are oriented in n directions. Each TRP transmits the same beam sweeping signal in each of the n directions. A UE monitors for receipt of the beam sweeping signal in each of k directions, using k antenna beams that are oriented in the k directions. This involves a total of n*k transmissions of the beam sweeping signal by each TRP in this example.

The antenna beam sweeping period shown in FIG. 2 includes k cycles. In each of the k cycles, each TRP transmits a beam sweeping signal in each of the n antenna beam directions of the TRP, and the UE monitors for receipt of a beam sweeping signal in one of k directions. In another embodiment, each TRP transmits a beam sweeping signal in one of the n directions and the UE monitors each of the k directions for receipt of a beam sweeping signal in each of n beam sweeping cycles in a beam sweeping period.

Each of the TRPs transmits the beam sweeping signal in n directions in the example shown in FIG. 2. In other embodiments, different TRPs may have different numbers of antenna beam directions. Although the TRPs and the UE have different numbers of antenna beam directions in FIG. 2, in some embodiments n=k.

The optimal beam pairs labelled in FIG. 2 are discussed in further detail below with reference to FIGS. 3 and 4.

Figure 3:
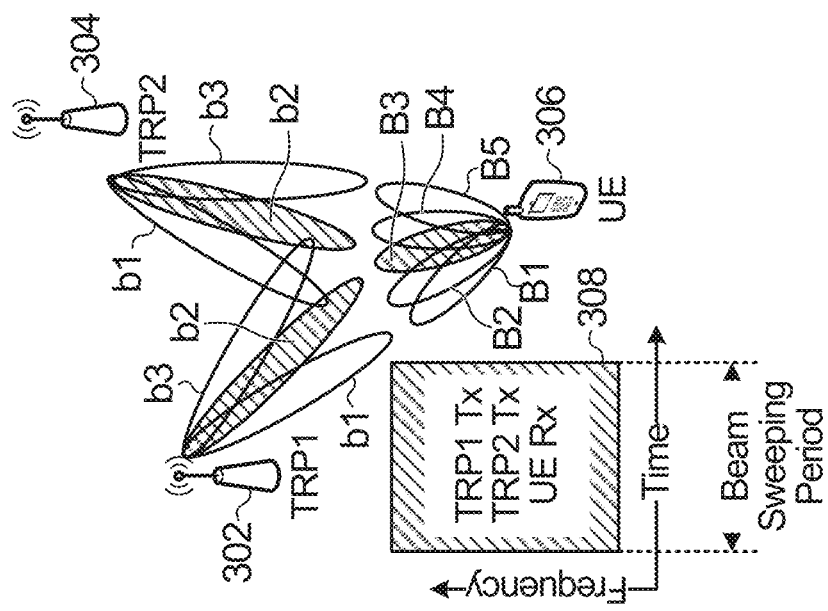
FIG. 3 is a block diagram illustrating downlink antenna beam sweeping in which multiple base stations use the same communication resources.

FIG. 3 is a block diagram illustrating downlink antenna beam sweeping in which multiple base stations use the same communication resources. FIG. 3, like FIG. 2, shows two TRPs 302, 304 and one UE 306. In FIG. 3, three antenna beams b1, b2, b3 are shown for each TRP 302, 304, and five antenna beams B1, B2, B3, B4, B5 are shown for the UE 306. In the notation of FIG. 2, n=3 and k=5. There may be more or fewer antenna beams in other embodiments.

The UE 306 in FIG. 3 can potentially connect to TRP1 302 and TRP2 304. Signals transmitted from the TRPs 302, 304 may therefore interfere with each other, and in this sense the TRPs are within an interference range of each other. If the TRPs 302, 304 transmit their beam sweeping signals using the same communication resources during an antenna beam sweeping period, then the UE 306 receives a combination of beam sweeping signals from the TRPs. Communication resources are shown as time/frequency resources in FIG. 3. When the TRPs 302, 304 use the same communication resources, the UE 306 may detect a highest received signal strength in its antenna beam B3 direction when both of the TRPs 302, 304 are transmitting in their beam b2 directions. TRP1 b2, TRP2 b2, and UE B3 could be identified as the optimal group of TRP1, TRP2, and UE antenna beams, as shown in FIG. 2. However, this is based on a highest received signal strength of a combination of beam sweeping signals from both of the TRPs 302, 304. Received signal strength and optimal antenna beams and directions for a connection between the TRP1 302 and the UE 306 could be different if TRP2 304 were not transmitting to the UE 306 using the same communication resources as TRP1 during beam sweeping. Received signal strength and optimal antenna beams and directions for a connection between the TRP2 304 and the UE 306 could also or instead be different if TRP1 302 were not transmitting to the UE 306 using the same communication resources as TRP2 during beam sweeping.

In an embodiment, different base stations use different communication resources to transmit beam sweeping signals during beam sweeping, to allow a UE to distinguish between beam sweeping signals that are received from the different base stations and to identify a preferred antenna beam direction for a connection with each of the base stations. The different communication resources could be separated by time according to a Time Division Multiplexing (TDM) scheme, by frequency according to a Frequency Division Multiplexing (FDM) scheme, by coding in a Code Division Multiplexing (CDM) scheme, or otherwise. In an embodiment, the different communication resources that are used by different base stations to transmit beam sweeping signals are orthogonal to each other. Therefore, a set of communication resources that includes different communication resources used by different communication devices within an interference range of each other could include orthogonal communication resources, such as time division multiplexed resources, frequency division multiplexed resources, and/or code division multiplexed resources.

Figure 4:
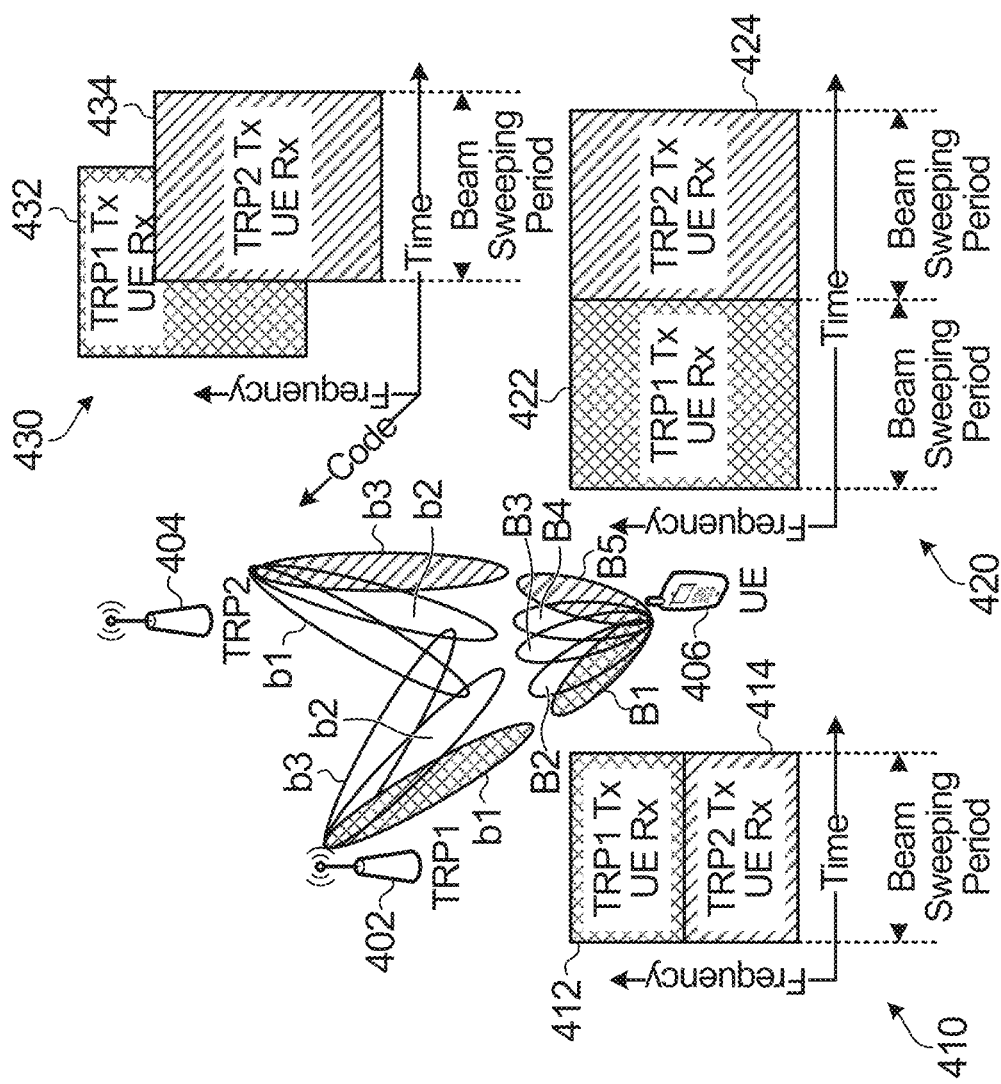
FIG. 4 is a block diagram illustrating downlink antenna beam sweeping in which multiple base stations use different communication resources.

FIG. 4 is a block diagram illustrating downlink antenna beam sweeping in which multiple base stations use different communication resources. The TRPs 402, 404 are examples of base stations, and a UE is shown at 406.

FIG. 4 also illustrates an FDM scheme 410 in which each TRP 402, 404 uses different frequency resources 412, 414 at the same times to transmit their beam sweeping signals. According to a TDM scheme 420, each TRP 402, 404 uses the same frequency resources at different times to transmit their beam sweeping signals. A CDM scheme is also shown at 430, in which frequency/time resources are multiplexed by codes for transmission of beam sweeping signals by the TRPs. These multiplexing schemes are examples, any of which could be used by the TRPs 402, 404 in different embodiments.

In some embodiments, serving base stations such as the TRPs 402, 404 can be identified before initial beam alignment begins, and resource planning can be coordinated accordingly. For example, a communication network could include both Low Frequency (LF) and HF TRPs, and an LF TRP could assist the UE 406 with initial antenna beam alignment. In an LF-assisted scenario, the UE 406 could first establish a connection with an LF-TRP. Antenna beam alignment and connection establishment with an LF TRP may be faster relative to antenna beam alignment and connection establishment with an HF TRP. This is because LF TRP antenna beams are not as highly directional as HF TRP antenna beams and therefore are not as narrow as HF TRP antenna beams. Consequently, connection establishment with an LF TRP need not necessarily involve beam sweeping. An LF TRP could provide to the UE 406 information that identifies the nearby HF TRPs 402, 404 with which the UE may be able to connect, and/or information regarding HF TRP beam sweeping signal communication resource allocations to enable to the UE to monitor for receipt of beam sweeping signals from the HF TRPs.

In another example, if a communication network only includes HF TRPs, a UE could first establish a connection with an HF TRP, possibly without optimal beam alignment in a downlink beam sweeping approach as shown in FIG. 3, in which the same communication resources are used in beam sweeping by different TRPs. An HF TRP could then provide to the UE 306 information that identifies the nearby HF TRPs 302, 304 with which the UE may be able to connect, and/or information regarding HF TRP beam sweeping signal communication resource allocations. This may enable UEs and TRPs to transition to the beam sweeping approach illustrated in FIG. 4, in which the HF TRPs 402, 404 again transmit beam sweeping signals, and the UE 406 monitors for receipt of beam sweeping signals from the HF TRPs to more accurately align the TRP and UE antenna beams.

LF TRPs could also or instead be involved in managing or distributing beam sweeping signal communication resource allocations to HF TRPs 402, 404. In communication networks in which only HF TRPs are implemented, beam sweeping signal communication resource allocations could be managed and distributed among HF TRPs with other network configurations or settings.

With the TRPs 402, 404 using different communication resources to transmit beam sweeping signals to the UE 406 during beam sweeping, the UE is able to distinguish between beam sweeping signals that are received from each of the TRPs. The UE 402 can then determine one or more received signal criteria, such as received signal strength, of a beam sweeping signal that is received from each TRP 402, 404. Based on the one or more received signal criteria, the UE 402 can identify a preferred or optimal antenna beam direction for a connection with each TRP 402, 404. With reference again to FIG. 2, an optimal antenna beam pair for a connection between TRP1 and the UE includes TRP1 beam b1 and UE beam B1 in this example. Similarly, the optimal beam directions or beam pair for a connection between TRP2 and the UE includes TRP2 beam bn, with n=3 in the example shown in FIG. 4, and UE beam Bk, with k=5 in the example shown in FIG. 4.

Selection of preferred or optimal antenna beams and directions is based on the different communication resources and received signal characteristics, which are measured or otherwise determined at a receiver. For downlink beam sweeping as shown in FIG. 4, the UE 406 is the receiver. The UE 406 distinguishes between the beam scanning signals that are received from TRP1 402 and TRP2 404 based on the different communication resources that are used by the TRPs. The UE 406 could measure received signal strength, or also or instead measure or determine other received signal characteristics, and identify the best UE antenna beam or reception direction from which the UE best received a beam sweeping signal from each TRP 402, 404. This could be a reception direction from which the UE 406 measured the highest received signal strength from each TRP 402, 404, for example. The UE 406 also determines a corresponding TRP antenna beam or direction in which the received beam sweeping signal was transmitted. The UE 406 transmits to each of the TRPs 402, 404 an indication of at least the TRP antenna beam or direction, corresponding to the best UE antenna beam or direction, in which the received signals were transmitted by each TRP.

The indication could be in any of various forms. A TRP 402, 404 could include in its beam sweeping signal an explicit indication of the TRP antenna beam or direction in which the beam sweeping signal was transmitted. The UE 406 could then include the same indication in a response to the TRP 402, 406 after the beam sweeping period ends. An explicit indication could be a beam index, such as a number from 1 to n for the beam sweeping example in FIG. 2.

Implicit signalling is also contemplated. With reference to FIG. 2, for example, each TRP could sequentially transmit a beam sweeping signal in each of n directions during each cycle of the beam sweeping period, and the UE may then identify the best reception direction based on the time or position of the best received beam sweeping signal in the sweeping cycle. The transmit direction corresponding to the best reception direction could also or instead be reported to a TRP implicitly. For example, a TRP could derive the best beam sweeping signal transmit direction from the timing of a signal in which the UE confirms receipt of a beam sweeping signal or otherwise provides a response to a beam sweeping signal. A confirmation of receipt and a response are examples of an implicit indication of the best reception direction.

The downlink beam sweeping examples in FIGS. 2 to 4 involve a single beam sweeping period. In other embodiments, multiple stages of beam sweeping could be used. For example, an initial coarse antenna beam alignment stage could use wider antenna beams for coarse alignment, and a fine alignment stage could involve beam sweeping over a smaller range of directions with narrower, more highly directional antenna beams.

In an embodiment, TRPs send synchronization signals to UEs during beam sweeping, and a UE then initiates an initial access procedure by transmitting a preamble to each TRP. A beam ID or other explicit indication of the best transmit antenna beam could be contained in the preamble. An indication of the best transmit beam could be implicit. For example, a UE could transmit a preamble using communication resources that are associated with the best transmit antenna beam of each TRP, to provide an implicit indication to each TRP as to which of the TRP's transmit beams is best for communications with the UE. A UE could, but need not necessarily, provide to a TRP an indication of the best receive antenna beam via which a beam sweeping signal was received from the TRP.

Figure 5:
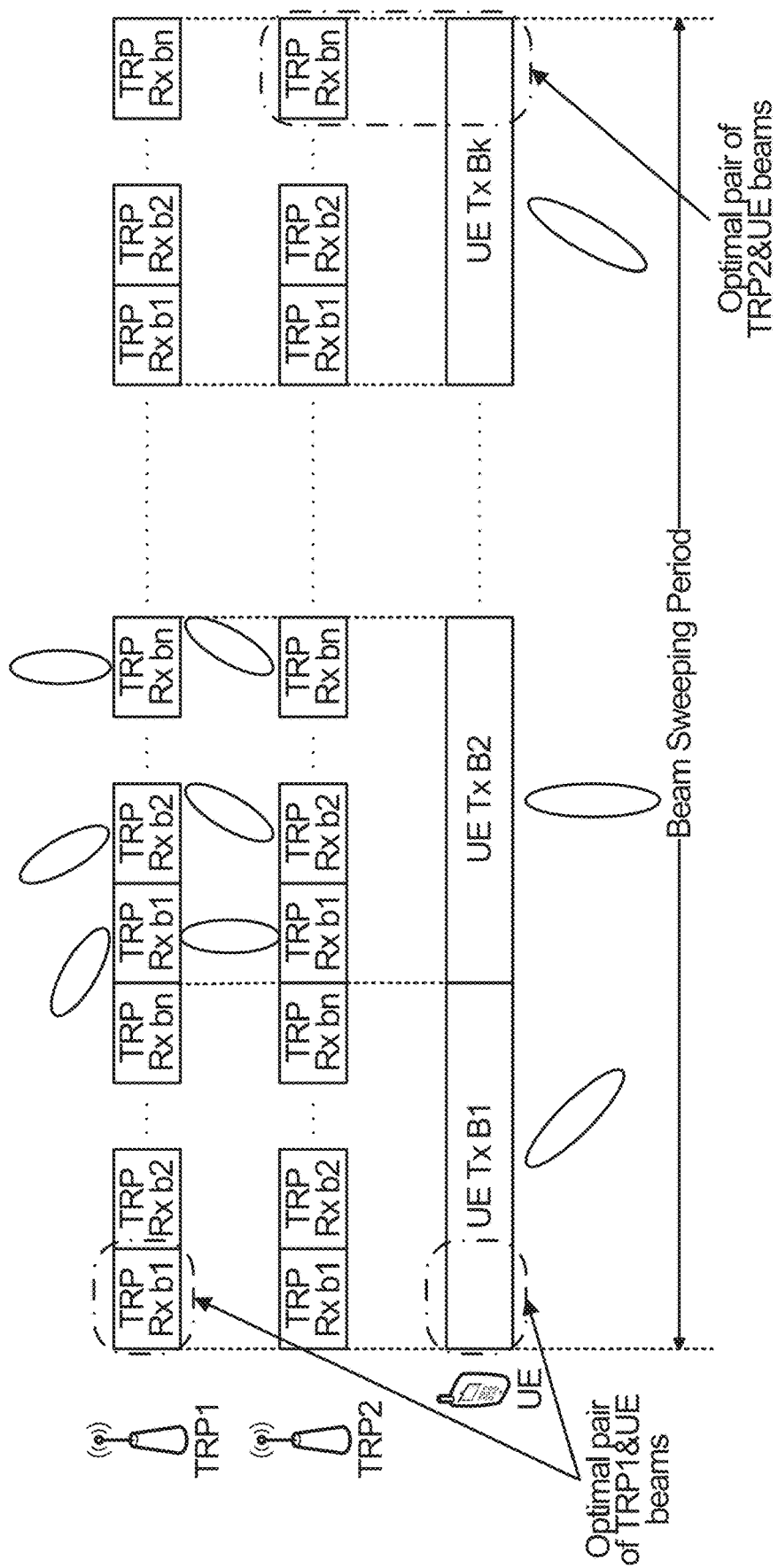
FIG. 5 is a block diagram illustrating uplink antenna beam sweeping.

FIGS. 2 to 4 relate to downlink antenna beam sweeping and alignment. FIG. 5 is a block diagram illustrating uplink antenna beam sweeping If reciprocity holds in respect of antenna beam alignment at both a TRP side and a UE side of a connection, the uplink beam sweeping might not be needed. Under a reciprocity condition, the best uplink antenna beam directions at a TRP and a UE are the same as the best downlink antenna beam directions at the same TRP and UE. Otherwise, if reciprocity does not hold at either a TRP or a UE, then uplink beam sweeping could be used to determine the best uplink beam directions at a TRP and a UE. Similarly, downlink antenna beam scanning might not be performed if antenna beam alignment has already been completed through uplink beam scanning, if reciprocity holds at both a TRP and a UE.

FIG. 5 is similar to FIG. 2, but in FIG. 5 the UE transmits a beam sweeping signal, which may include a predetermined sequence for example, and the TRPs monitor multiple antenna beam directions for reception of the beam sweeping signal. In an embodiment, UEs obtain the beam sweeping signals used for uplink beam sweeping after connecting to a TRP through downlink beam sweeping. Uplink beam sweeping could instead be LF-assisted, with LF TRPs providing sequences to UEs, for example.

Figure 6:
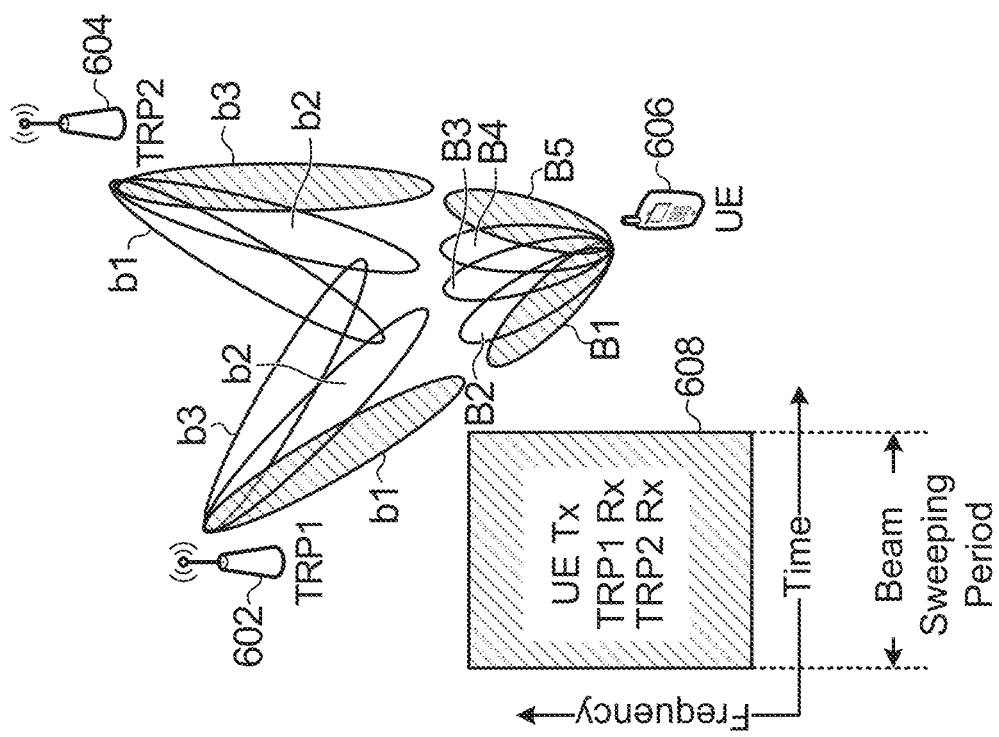
FIG. 6 is a block diagram illustrating uplink antenna beam sweeping between a UE and multiple base stations.

FIG. 6 is a block diagram illustrating uplink antenna beam sweeping between a UE and multiple base stations. If only one UE 606 is attempting to establish a network connection with the TRPs 602, 604, then no communication resource separation or multiplexing is needed, as shown at 608. A beam sweeping signal is transmitted only by the UE 606 in this example, and each TRP 602, 604 is able to identify its best reception direction for a connection with the UE.

Figure 7:
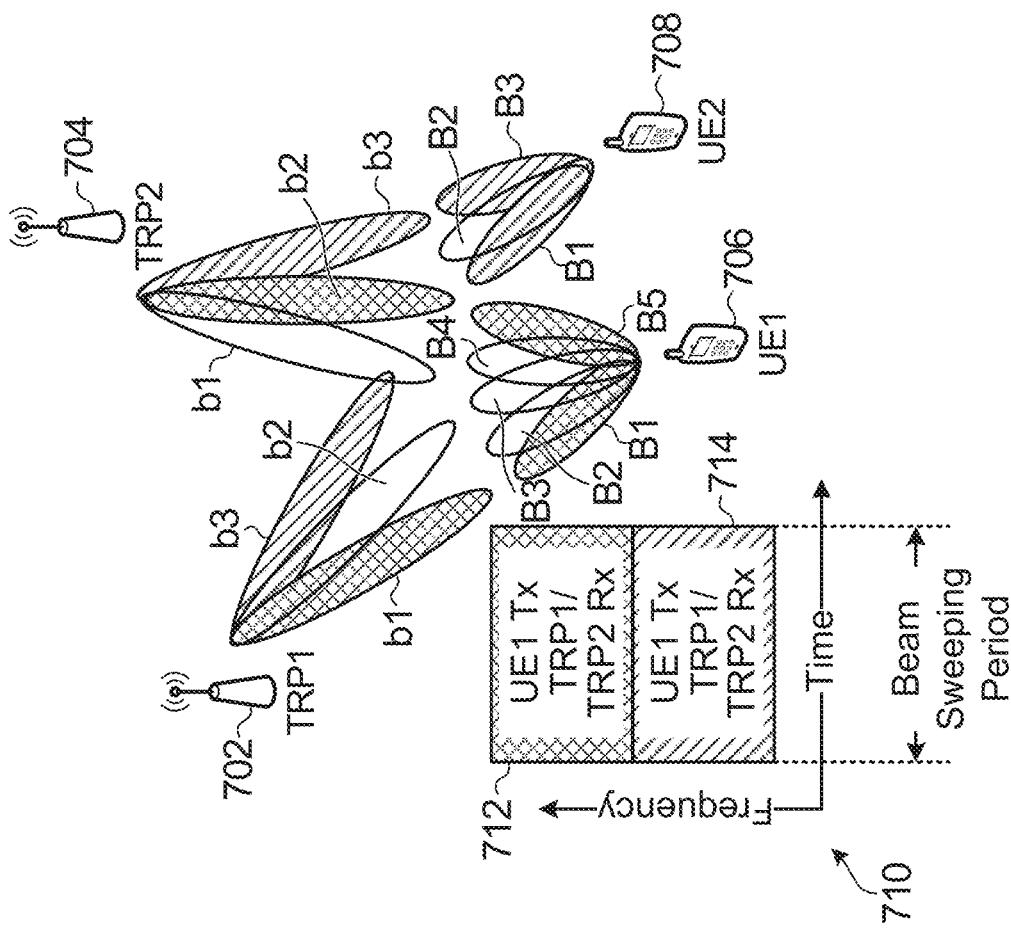
FIG. 7 is a block diagram illustrating uplink antenna beam sweeping in which multiple UEs use different communication resources.

FIG. 7 is a block diagram illustrating uplink antenna beam sweeping in which multiple UEs that are close to each other use different communication resources. If multiple UEs 706, 708 attempt to access a network through connections with at least one common TRP 702, 704, as in FIG. 7, different communication resources are used by the UEs to transmit beam sweeping signals to the TRPs. An FDM scheme 710 is shown by way of example, in which the UEs 706, 708 use different frequency resources 712, 714. The frequency bands assigned to each UE 706, 708 for uplink beam alignment or training could be signaled to the UEs from an LF-TRP, or from an HF-TRP during downlink beam sweeping, for example. TDM or CDM could be used in other embodiments, in which similar signaling options could be implemented. Preferred or optimal antenna beam directions for each UE 706, 708, can then be identified by each TRP 702, 704.

In FIG. 7, the TRPs 702, 704 receive beam sweeping signals from the UEs 706, 708 and measure or otherwise determine received signal characteristics, based upon which the best TRP antenna beam or reception direction for each TRP and the corresponding best UE antenna beam or transmit direction for each TRP connection are identified. The TRPs 702, 704 also send to each UE 706, 708 an indication of at least the best UE antenna beam or transmit direction from each UE. Explicit or implicit signaling could be used for these indications, as described above for downlink beam sweeping.

In some embodiments, the UEs 706, 708 could also or instead use power control during uplink antenna beam sweeping. For example, power boosting could be combined with communication resource allocation to boost transmit power at allocated communication resources for antenna beam training. A UE could also or instead apply power nulling to other communication resources that have not been allocated for its transmission of a beam sweeping signal. Such techniques could further enable base stations such as the TRPs 702, 704 to identify the best reception direction for each UE 706, 708 in a multi-connection scenario.

As noted above for downlink beam sweeping, multiple stages of beam sweeping with different beam widths and beam sweeping ranges could be used in uplink beam sweeping.

Uplink beam sweeping as shown in FIG. 7 and described herein could be employed in other multi-connection embodiments, with only one TRP and multiple UEs, for example.

Communication resource coordination during downlink or uplink beam sweeping could improve beamforming gain by better aligning beam directions in a multi-connection scenario. This is discussed in detail above with reference to the optimal beam group and the optimal beam pairs in FIG. 2, but also applies to other embodiments in which beam sweeping signals are transmitted by different transmitters.

After the optimal or preferred antenna beams or directions have been identified through downlink or uplink beam sweeping, TRP/UE connections can be established. In an embodiment, each TRP-UE pair maintains a record of designated antenna beams or directions for each connection. With reference to FIG. 4, for example, after the optimal beam pairs for TRP1 and TRP2 are identified, the UE 406 maintains a record of at least UE beam B1 for a connection to TRP1 402 and UE beam B5 for a connection to TRP2 404. Similarly, TRP1 402 maintains a record of at least TRP1 beam b1 for a connection to the UE 406, and TRP2 404 maintains a record of at least TRP2 beam b3 for a connection to the UE 406.

Antenna beam/connection records could be in the form of lists or tables in memory, for example. A beam table or connection table stored by the UE 406 could include a list of UE beam indices for its connected TRPs and the corresponding UE-to-TRP directions for these beams. Other information, such as TRP and/or connection identifiers could also be stored in such tables at UEs. At each of the TRPs 402, 406, a beam table or connection table could store TRP beam indices for UEs that are connected to the TRP, the corresponding TRP-to-UE directions for these beams, and an identifier of each connected UE. Other information such as UE beam indices for a TRP could also be stored in such a table at a TRP. This could be used, for example, to enable a TRP to send signaling to a UE via control channel, to provide an indication to the UE as to a particular antenna beam that is to be used for transmission or reception.

In some embodiments, TRPs and UEs maintain multiple transmit and receive beam indices, and each beam that is identified by a beam index corresponds to one connection. In another embodiment, an antenna beam that is identified by a beam index is used for both transmission and reception. Beam indices are described herein solely for the purposes of illustration. Other information identifying or indicating beam directions or beams may be used in other embodiments.

A UE might not be aware of the identity of its serving TRPs, and could store a list of just UE beam indices of antenna beams or directions that are associated with active connections with TRPs. For example, after initial beam training, UE beam indices could be assigned to the identified optimal antenna beams or directions, and mapped to unique and fixed values. Although the best beams or directions for communications with a TRP may be updated as a UE is moved or channel conditions change due to obstacles, for example, when the beams or directions for a connection are updated, a UE beam index remains unchanged in a fixed index embodiment.

Figure 8:
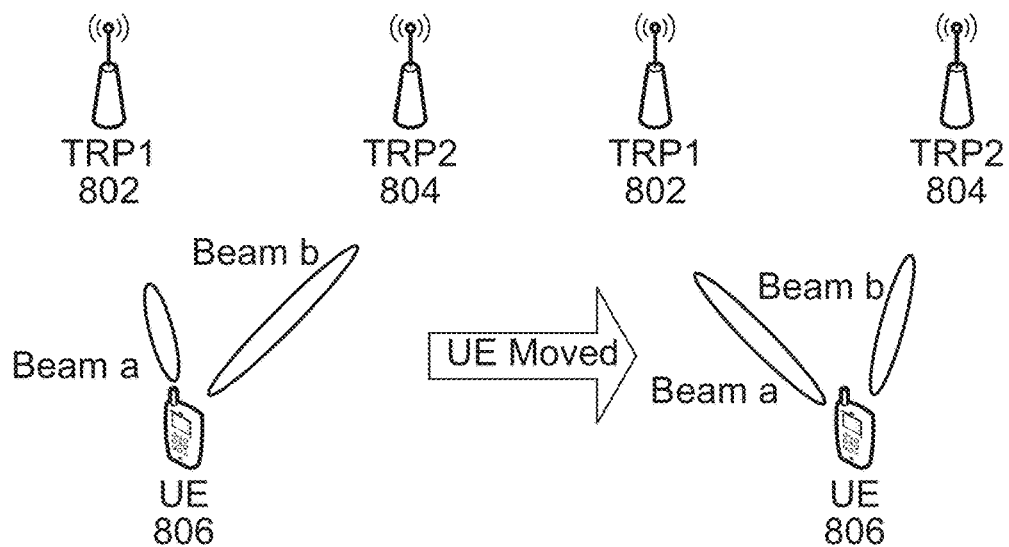
FIG. 8 is a block diagram illustrating antenna beam management using fixed beam indices.

FIG. 8 is a block diagram illustrating antenna beam management using fixed beam indices. When the UE 806 is moved between different locations relative to TRP1 802 and TRP2 804, the antenna beam directions between the UE and each TRP change. However, in the example shown, the UE beam index a for the connection between the UE 806 and TRP1 802 and the UE beam index b for the connection between the UE 806 and TRP2 804 remain the same after the UE is moved. A fixed beam index maintains a fixed mapping between the UE 806 and the fixed beam index a, b for each TRP 802, 804. This could be useful to simplify signaling by each TRP 802, 804 to the UE 806 to identify the antenna beam or direction to be used for transmitting communication signals after scheduling for a connection, for example. Although this type of fixed beam index involves beam direction updates at the UE 806 when the direction associated with a fixed beam index changes, fixed beam indices may reduce signaling between TRPs and UEs. With fixed beam indices, a TRP does not need to know updated UE beam directions, but rather just the fixed logical UE beam indices. Fewer bits are used to quantize logical beam indices, of which there are a limited number, when a TRP transmits control channel signaling to a UE to indicate the particular antenna beam that is to be used by the UE for transmission and reception, for example, relative to a number of bits that would be needed to signal beam directions. Such control channel signaling may be sent by an LF-TRP, or by an HF-TRP using wider antenna beams than the highly directional antenna beams that are used for HF TRP communications.

In another embodiment, beam indices could uniquely correspond to beam directions. When a UE is moved, beam directions change, and beam indices also change. Discrete directions could be specified using a hierarchical beam index structure, such as beam index=wide beam index*x+narrow beam index, with a wide beam index that is modulo x, for example. In an embodiment, x=4. This approach may involve more signaling than a fixed index approach, because when a UE antenna beam direction changes, the UE signals updated antenna beam direction to a TRP. More bits are used to quantize antenna beam directions than beam indices when a TRP transmits control signaling to a UE to indicate the particular antenna beam that is to be used for transmission and reception. As noted above, such control channel signaling may be sent by an LF-TRP or by an HF-TRP.

Antenna beam management at a TRP could be similar to UE antenna beam management. A TRP could use fixed logical beam indices along with corresponding beam directions, or use beam directions directly as form of beam indices. However, these two options might not involve different signaling overhead, because TRPs need not provide a UE with any indication of the TRP beam indices/directions that are to be used for transmission and reception by the TRP.

As shown in FIG. 8, movement of the UE 806 may change the preferred direction for communications between the UE and each TRP 802, 804. Beam tracking may be used to update beam directions for communications between TRPs and UEs. Beam tracking, after a connection has been established, could use a smaller beam sweeping range and narrower antenna beams than initial beam training. This is because UEs and TRPs are already at least coarsely beam-aligned after a connection has been established.

With reference to FIG. 7, after initial beam sweeping and alignment, each TRP 802, 804 has multiple TRP-UE beam indices for the multiple connections to the UEs 706, 708. As in initial beam sweeping, the UEs 706, 708 transmit tracking signals for beam tracking in different, orthogonally separated in some embodiments, communication resources. Usage of communication resources by the UEs 706, 708 could be time multiplexed, with each UE 706, 708 taking turns (periodically) to execute beam tracking. The TRPs 702, 704 might only perform beam tracking for scheduled UEs in some embodiments. In a non-full buffer scenario, a UE with an empty buffer, that might not be scheduled, could be periodically triggered to perform beam tracking. Beam tracking could be triggered, for example, by transmitting a beam tracking control or command signal from a TRP 702, 704 or another base station to cause non-scheduled UEs to initiate beam tracking.

Time multiplexing of communication resources for beam tracking represents one embodiment. FDM or CDM, if a TRP has multiple RF chains for example, or a combination of two or more of time, frequency, and code multiplexing could be used to multiplex communication resources during uplink beam tracking.

In a multi-connection scenario in which a single UE has multiple connections to different TRPs as in FIG. 4, a UE 406 may have multiple UE-TRP beam indices, and beam tracking preferably involves communication resource multiplexing for transmission of tracking signals by the TRPs 402, 404. TDM, FDM or CDM if the UE 406 has multiple RF chains, or a combination of two or more of these techniques, could be used to multiplex communication resources during downlink beam tracking.

These beam tracking examples could be applied in joint transmit and receive tracking, transmit tracking only, and receive tracking only.

Beam tracking, like initial beam training, involves transmission of signals in multiple directions and detection of the best directions for each of multiple connections. Beam tracking signals could be considered a special case of beam sweeping signals, in the sense that both initial beam training and beam tracking involve transmitting and receiving signals in multiple directions to sweep a range of directions.

FIGS. 2 to 8 and the descriptions thereof relate primarily to initial beam training, establishing connections, and beam tracking. Other aspects of the present disclosure relate to using such connections for communications between base stations and UEs.

A UE that has multiple connections to different base stations could select one or more of those base stations, or the antenna beam over which the connection to such a base station has been established, as an anchor base station or an anchor beam. In an LF-assisted HF system, for example, a UE could select a preferred anchor LF TRP from among multiple LF-TRPs with which the UE has connections. In an embodiment, the LF TRP or beam associated with a strongest received signal that is detected at a UE during beam sweeping or communications, is selected by the UE as an anchor LF TRP or beam. Similarly, in an HF-only system, a UE could select an anchor HF TRP or beam from among multiple HF TRPs or beams from which the UE has connections. One possible selection criterion is the strongest received signal at the UE.

An anchor TRP could be responsible for such actions as sending control signaling to UEs, performing scheduling for a set of TRPs if centralized scheduling is used in a communication network, and/or coordinating a set of TRPs to distribute data, for example. Control signaling by an anchor TRP could provide such information as beam indices, scheduling grant information, and/or acknowledgement/negative acknowledgement (ACK/NACK) information to UEs.

UE-centric assignment or selection of anchor TRPs may be based on the TRP or beam from which a UE receives the strongest signal or associated with a highest Signal to Interference-plus-Noise Ratio (SINR) for instance. An anchor TRP for one UE might not be the anchor TRP for another UE, and therefore different TRPs may be the anchor TRP for different groups of UEs.

In another embodiment, anchor TRPs are pre-assigned as part of network configuration. Such pre-assignment could be based on geography, for example, to assign different TRPs or beams as anchor TRPs or beams to different parts of buildings or streets. Information that is provided by UEs could be taken into account by TRPs or a network operator in determining how to assign anchor TRPs. However, in a pre-assignment embodiment a UE does not decide on its own which TRP is to be the anchor TRP for the UE.

TRPs could also or instead negotiate anchor TRP assignments, based at least in part on UE feedback for example, and notify UEs of negotiated TRP assignments.

In some embodiments, LF-TRPs may be preferred as anchor TRPs over HF-TRPs. For example, LF-TRPs might be considered more reliable than HF TRPs for control signaling.

When a UE is moved, the anchor TRP or beam could change. A UE might receive a strongest signal from one TRP when it is at one location, but from a different TRP when it is moved to a different location. The anchor TRP could be changed accordingly. In an embodiment in which anchor TRPs are pre-assigned, for example, anchor TRPs for a UE could change based on current location of the UE.

Any of different mechanisms could be implemented for managing data transmission in embodiments in which a UE has multiple available connections to different TRPs. For example, control signaling could notify the UE as to the particular receive beam(s) that are to be used to receive data. An LF TRP in an LF-assisted HF system or an anchor HF TRP, for example, could send control signaling to the UE specifying the receive beam(s) that should be monitored for data.

Data could also or instead be alternately transmitted to UEs over different beams in a pre-defined manner. For example, with 2 beams, data could be transmitted in odd Transmission Time Intervals (TTIs) over one beam and in even TTIs over the other beam. Other patterns are also contemplated. If one beam is in better condition than another, based on any of various possible beam condition criteria such as received signal strength, then more communication resources could be assigned to the beam that is determined to be in better condition than to the beam that is determined to be in worse condition.

In such alternate transmission embodiments, there might be no control signaling to specify particular beam indices. Control signaling could instead specify a transmission or pattern index, for example. Such control signaling could be transmitted by either an LF TRP in LF-assisted HF system or an anchor HF TRP in some embodiments. However, alternate transmission embodiments may provide less flexibility in beam assignment than embodiments with signaling of beam assignment, because alternate transmission patterns are pre-defined and certain patterns might not adapt well to channel condition fluctuations.

UEs could also or instead monitor multiple receive beams at the same time. If all receive beams are monitored, then no control signaling would be required to assign beams for UEs to monitor for received data. Beams could even be dynamically assigned for transmission by TRPs in embodiments in which multiple receive beams are monitored. Simultaneous receive beam monitoring could be implemented, for example, with different RF chains for monitoring different beams. However, such beam monitoring could reduce beamforming gain, in that some monitored beam directions are effectively wasted if data is being transmitted over only one connection with one TRP while a UE monitors all beam directions.

These options, which could also or instead be applied to uplink transmission from UEs to base stations, are considered in further detail below.

Figure 9:
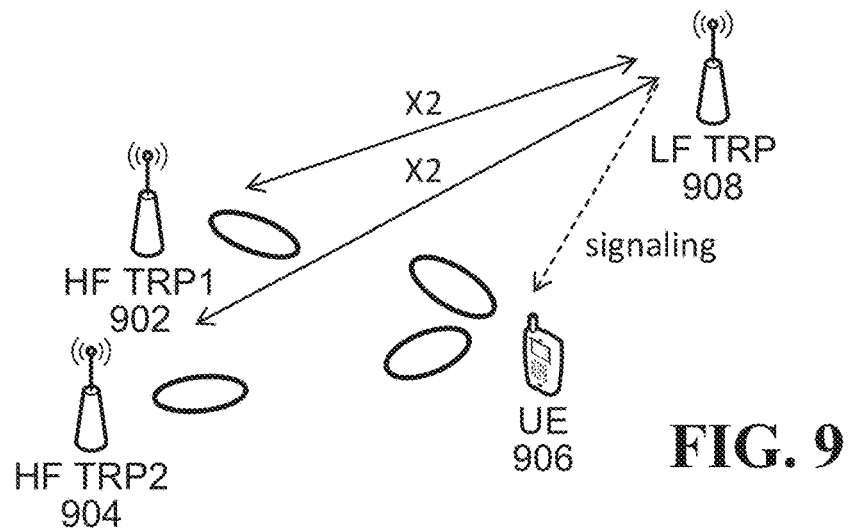
FIG. 9 is a block diagram illustrating transmission control according to an embodiment.

FIG. 9 is a block diagram illustrating transmission control according to an embodiment. FIG. 9 is an example of an LF-assisted HF system, with HF TRPs 902, 904, a UE 906, and an LF-TRP 908. In this example, the LF TRP 908 sends control signaling, via a control channel such as the Physical Downlink Control Channel (PDCCH) for example, to inform the UE 906 as to the receive beam(s) that it is to monitor for downlink data. The LF TRP 908 also communicates with the HF-TRP(s) 902, 904 associated with transmit beam that is paired with signaled UE receive beam, via an X2 interface in the example shown, to inform the HF TRP(s) as to the transmit beam(s) to be used to transmit data to the UE 906.

Figure 10:
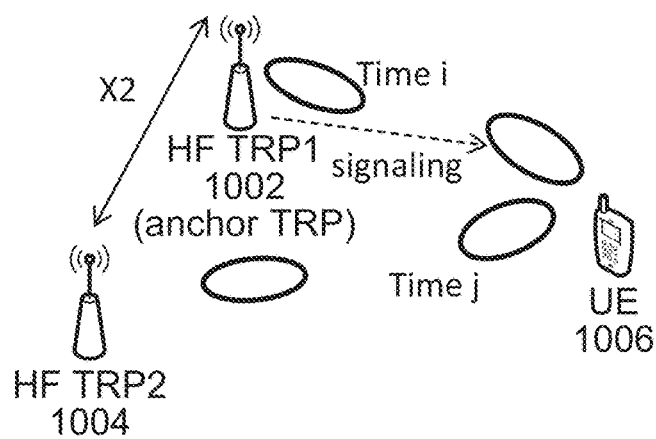
FIG. 10 is a block diagram illustrating transmission control according to another embodiment.

FIG. 10 is a block diagram illustrating transmission control according to another embodiment, in an HF standalone system that includes HF TRPs 1002, 1004 and a UE 1006, without LF TRPs. In this example, the UE 1006 receives control signaling from one HF-TRP 1002 (the anchor TRP), but can receive other transmissions (e.g., downlink data) from either or both of the TRPs 1002, 1004. Beam switching is performed if the anchor TRP and the transmitting TRP are different. As shown in the example of FIG. 10, in which the HF TRP2 1004 is the transmitting TRP, control signaling is sent from the anchor HF TRP1 1002 to the HF TRP2 1004 via an X2 interface, to inform the HF TRP2 1004 as to the transmit beam that is to be used to transmit data to the UE 1006.

In FIGS. 9 and 10, the UE 906, 1006 could receive data over one beam at a time with all receive antenna elements, or multiple beams at a time if the UE includes multiple RF chains. For N receive beams, however, each beam loses an array gain of $-10*\log 10(N)$ dB as compared to using all antenna elements to form a single receive beam.

This type of signaled transmission control may enable dynamic beam assignment, for each time unit such as each TTI for example, but involves control signaling of at least the UE downlink receive beam(s). Control signaling of the downlink transmit beam(s) is also sent to the transmitting HF TRP(s) in an LF-assisted system as in FIG. 9 or when the transmitting HF TRP in an HF standalone system is not the anchor HF TRP as in FIG. 10.

Uplink transmission could be similarly controlled. The LF-TRP 908 in an LF-assisted HF system or the anchor HF TRP1 1002 could send to the UE 906, 1006 uplink scheduling grant information and control information specifying the uplink transmit beam(s) to be used by the UE for uplink transmission. The uplink transmit beam(s) could include a beam that can be received by either of the HF TRPs 902, 904 or 1002, 1004. In this example, uplink transmission is grant-based, and the receiving HF TRP(s) 902, 904 or 1002, 1004 already have information regarding the beam(s) to which the UE 906, 1006 has been granted access. Therefore, there is no separate control signaling to the receiving HF TRP(s) 902, 904 or 1002, 1004 in this example.

Figure 11:
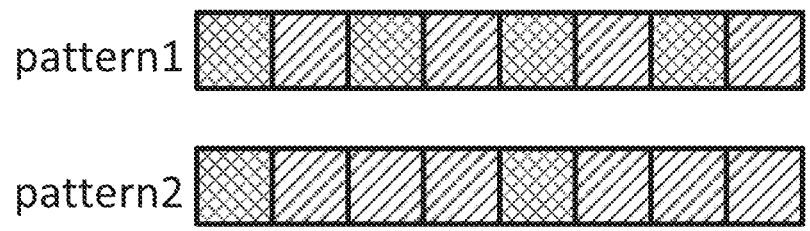
FIG. 11 is a block diagram illustrating transmission patterns in accordance with a further embodiment.

FIG. 11 is a block diagram illustrating transmission patterns in accordance with a further embodiment. In an LF-assisted HF system such as the system shown in FIG. 9, the LF TRP 908 sends control signaling to notify the UE 906 and the HF TRPs 902, 904 of a transmission pattern for transmission of data. In the example shown in FIG. 11, there are two patterns, and the control signaling in this example includes a pattern index or other information from which the UE 906 and the HF-TRPs 902, 904 can determine the transmission pattern that is to be used for a current downlink transmission from the HF TRPs to the UE.

In an HF standalone system as shown in FIG. 10, the UE 1006 receives control signaling from the anchor HF TRP1 1002, and can receive other transmissions (e.g., downlink data) from either or both of the TRPs 1002, 1004. The HF TRP2 1004 also receives control signaling, from the anchor HF TRP2 1002, that specifies the transmission pattern that is to be used. The HF TRPs 1002, 1004 transmit data to the UE 1006 in accordance with the signaled pattern.

The UE 906, 1006 can receive data over one beam at a time, even if both beams are simultaneously scheduled by multiple TRPs 902, 904 or 1002, 1004. In a multi-RF chain embodiment, all RF chains could be used for a single beam at a time to provide high array gain, or the RF chains could be used to receive data from multiple beams simultaneously.

Transmission pattern control could involve dynamic assignment of the patterns via PDCCH, but the periodicity of pattern changes may depend on pattern length. For example, a short pattern could be changed more often than a longer pattern, to adapt to channel condition changes or data traffic variations. Pattern assignment could instead be semi-static, via Radio Resource Control (RRC) signaling for example.

Transmission patterns could be equally distributed across multiple beams, or more weight could be given to particular beams by assigning more time units to those beams for example.

This transmission control methodology could also or instead be applied to uplink transmission. The LF-TRP 908 in an LF-assisted HF system as in FIG. 9 or the anchor HF TRP1 1002 in FIG. 10 sends an assigned pattern index or other pattern information in control signaling to the UE 906, 1006 for use in uplink transmission to the TRPs 902, 904 or 1002, 1004.

A third transmission control option is also applicable to both LF-assisted and HF standalone systems. A UE monitors multiple beams simultaneously, and the UE can receive data from one or multiple beams. At the UE, antenna elements associated with an RF chain form a receive beam. If there are N RF chains, then up to N receive beams can be formed at the same time. As noted above, however, if there are N receive beams, then each beam loses an array gain of $-10*\log 10(N)$ dB as compared with using all antenna elements to form a single receive beam.

In an embodiment in which the UE is only scheduled by one TRP or fewer than all TRPs from which it can receive signals, then some of the receive beams are effectively wasted. Separate RF chains forming separate receive beams might not be efficient if a UE can only be scheduled by one TRP at a time. It may therefore be preferable to limit the number of beams to be monitored by a UE, depending upon UE scheduling and/or other UE conditions, for example.

Similarly, for uplink transmission, TRPs may monitor multiple beams, and a UE may transmit using multiple beams.

To summarize the transmission control options described above, signaling of receive and transmit beams may enable flexibility in beam assignment, but involve more control signaling overhead relative to other options. With alternate transmission/reception, there may be less flexibility in beam assignment relative to signaled beam assignment, but alternate transmission/reception may involve less control signaling to signal a transmission/reception pattern that receive and transmit beams. Simultaneous monitoring/transmission of multiple beams provides flexibility in beam assignment and lower signaling overhead than the other transmission control methods described above. However, there may be reduced array gain in forming multiple receive beams compared to the other methods. Time and power may also be wasted in monitoring multiple beams if transmitters are not transmitting when beams are being monitored at a receiver. These embodiments for managing transmissions in multi-connection scenarios may trade off performance and signaling.

Figure 12:
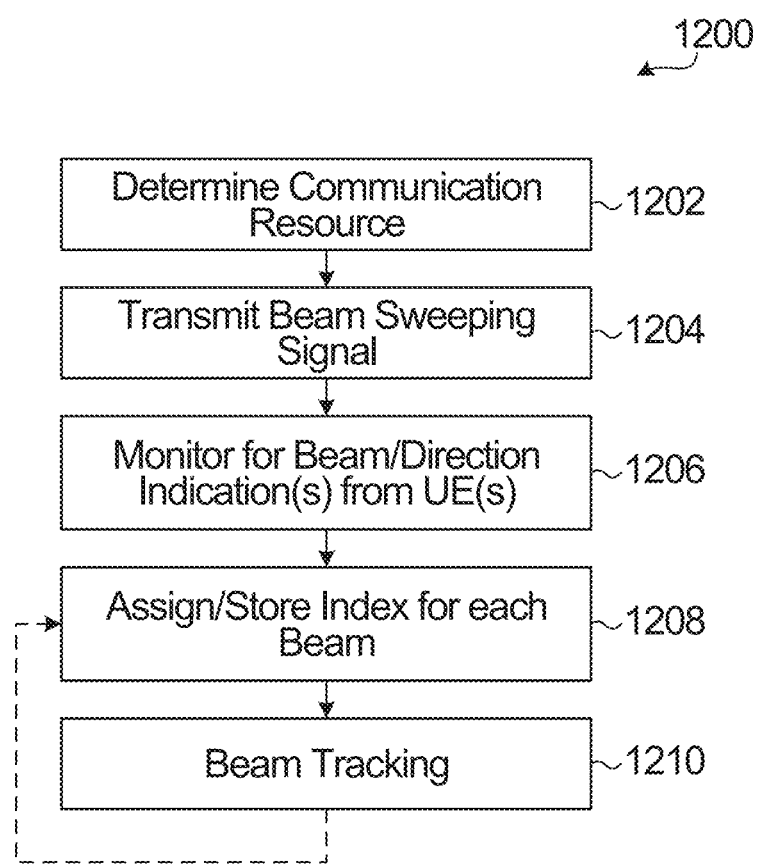
FIG. 12 is a flow diagram illustrating a method according to an embodiment.

FIG. 12 is a flow diagram illustrating a method according to an embodiment. The example method 1200 involves determining at 1202 a communication resource that is to be used for transmission of a beam sweeping signal by a communication device. The determined communication resource is different from communication resources for transmission of beam sweeping signals by other communication devices that are within an interference range of the communication device, as described above with reference to FIGS. 4 and 7, for example. The determination could be made at 1202 based on received control signaling, for example. An indication of a beam sweeping communication resource could be stored at a communication device and accessed before transmitting a beam sweeping signal, to thereby determine at 1202 the communication resource that is to be used for transmission of the beam sweeping signal.

At 1204, the beam sweeping signal is transmitted using the determined communication resource and multiple antenna beams that are oriented in multiple directions. The transmission in multiple directions could be simultaneous or sequential. Simultaneous transmission could be performed by communication devices that have multiple RF chains, for example.

The operations illustrated at 1202, 1204 could be performed at a base station for downlink beam scanning, or at a UE for uplink beam scanning.

In some embodiments, a communication device that transmits a beam sweeping signal at 1204 also monitors at 1206 for receipt of an indication, from another communication device that receives the beam sweeping signal, of a direction from which that other communication device best received the beam sweeping signal. The indication could be an explicit indication of the best reception direction, or an implicit indication from which the first communication device that transmitted the beam sweeping signal determines the best reception direction.

Other operations may also or instead be performed. For example, a connection could be established with another communication device that receives the beam sweeping signal, via an antenna beam that is oriented in the best reception direction. Connection establishment could involve assigning and/or storing a beam index. In a multi-connection scenario, beam indices could be assigned and stored for each of multiple antenna beams.

Beam tracking as shown at 1210 is another example of an operation that could be performed in some embodiments, and could involve repeating the transmitting at 1204 and the monitoring at 1206, to track movement of a communication device.

Beam tracking could involve beam scanning in the same direction, uplink or downlink, as initial beam training, or the opposite direction. For example, initial beam training could be performed in the downlink direction, by transmitting beam sweeping signals from base stations to UEs, and subsequent beam tracking could be performed in the uplink direction, by transmitting beam tracking signals from UEs to base stations. In this case, a base station that transmits a beam sweeping signal at 1204 could perform beam tracking at 1210 by monitoring the multiple antenna beams for receipt of a beam tracking signal from a UE, and transmit to the UE an indication of a further direction from which the base station best received the beam tracking signal from the UE.

Beam indices and/or directions could be updated at 1208 after beam tracking at 1210.

In some embodiments, beam tracking at 1210 is performed periodically. Other embodiments could involve control of beam tracking, by a base station for example. A base station could transmit to a UE a signal to cause the UE to initiate a beam tracking procedure that involves transmitting the beam tracking signal from the UE and monitoring at the UE for receipt of the indication of the further direction from the base station.

Figure 13:
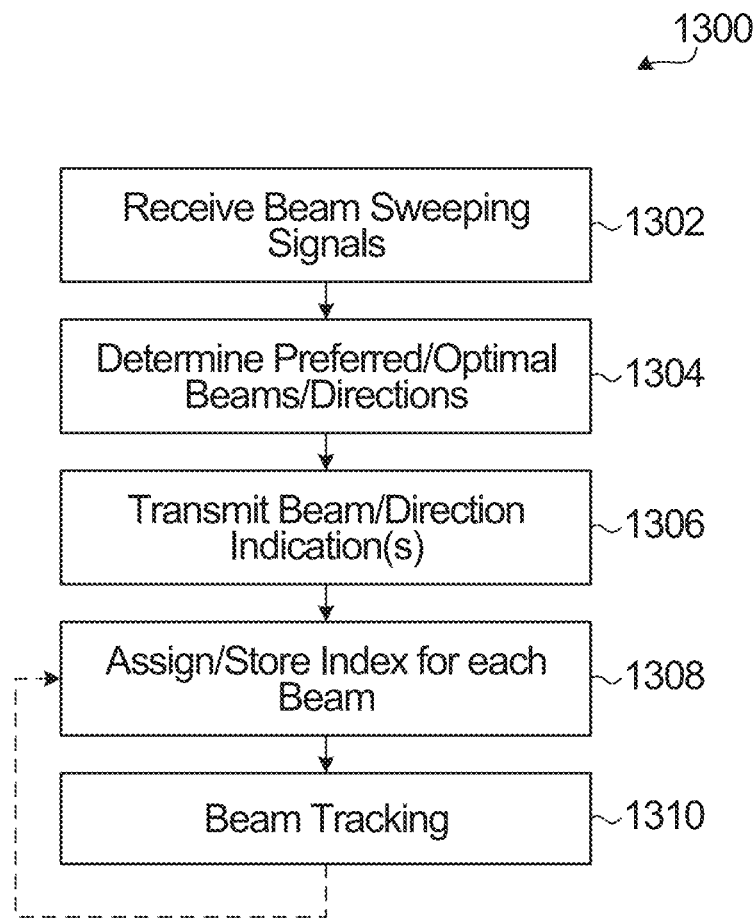
FIG. 13 is a flow diagram illustrating an example method according to a further embodiment.

FIG. 13 is a flow diagram illustrating an example method according to a further embodiment. The example method 1300 involves monitoring multiple antenna beams at 1302 to receive beam sweeping signals from other communication devices. The antenna beams are oriented in multiple directions. The beam sweeping signals are received from other communication devices in different communication resources. For each communication device from which a beam sweeping signal is received, a preferred or optimal beam or direction is determined at 1304, based on the different communication resources. The preferred beam or direction is a beam or direction from which a received beam sweeping signal is best received from each communication device.

Feedback could be provided to each communication device at 1306. For example, the receiving communication device could determine, for each other communication device from which a beam sweeping signal is received, a transmit direction in which the received beam sweeping signal was transmitted by the other communication device, and an indication of the determined transmit direction could then be transmitted to the other communication device at 1306. The indication could be an explicit indication of the transmit direction from which a beam sweeping signal was best received from each other communication device, or an explicit indication from which each other communication device determines its best transmit direction.

Beam management at a communication device that receives beam sweeping signals could involve beam indices and/or directions. In embodiments that involve beam indices, a beam index for each best direction could be assigned and/or stored at 1308.

In an embodiment, the method 1300 is performed at a UE, and the operations at 1302, 1304, 1306 are illustrative of downlink beam sweeping and training. Beam tracking at 1310 could be performed in the uplink direction, by transmitting a beam tracking signal from the UE using the UE antenna beams, and then monitoring at the UE for receipt of an indication, from a base station, of a further direction from which the base station best received the beam tracking signal from the UE.

Uplink beam tracking could be initiated by a UE periodically, or in response to command from a base station, for example. The UE could monitor for receipt of a signal from a base station to cause the UE to initiate a beam sweeping procedure, and then, in response to receipt of such a signal, transmit the beam tracking signal and monitor for receipt of the indication from the same base station and/or a different base station.

Beam indices, directions, or both could be updated at 1308 after beam tracking at 1310.

The example methods 1200, 1300 are intended for illustrative purposes. Other embodiments could involve performing the illustrated operations in any of various ways, performing fewer or additional operations, and/or varying the order in which operations are performed. For example, antenna beam management in a communication network could involve performing some of the operations shown in FIGS. 12 and 13 at base stations and performing others of the illustrated operations at UEs. Other variations could be or become apparent to a skilled person based on the present disclosure.

The embodiments described with reference to FIGS. 12 and 13 relate to example methods. Apparatus embodiments are also contemplated.

Figure 14:
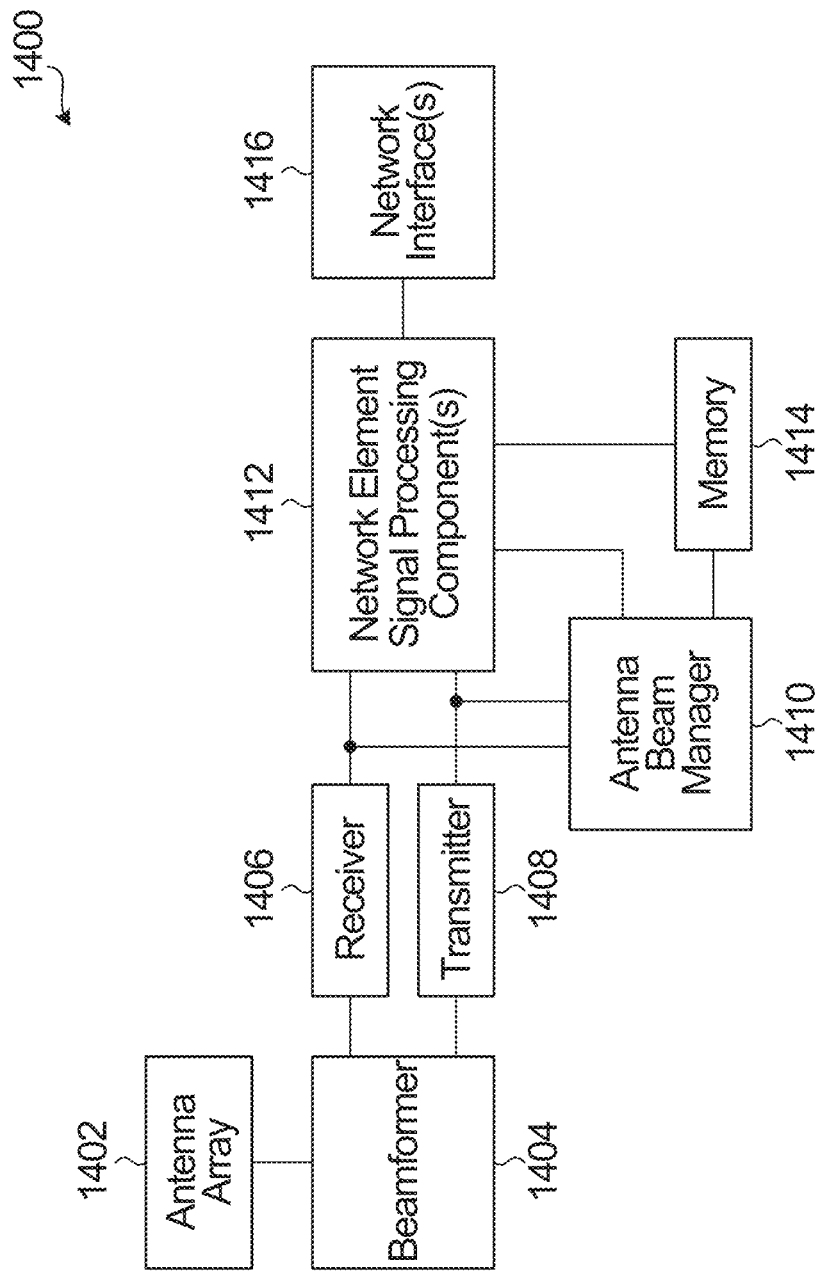
FIG. 14 is a block diagram illustrating an example base station.

FIG. 14 is a block diagram illustrating an example base station. The example base station 1400 includes an antenna array 1402, a beamformer 1404 coupled to the antenna array, and a receiver 1406 and a transmitter 1408 coupled to the beamformer 1404. The receiver 1406 and the transmitter 1408 are also coupled to an antenna beam manager 1410, and the receiver, the transmitter, and the antenna beam manager are coupled to one or more other components generally shown as base station signal processing component(s) 1412. A memory 1414 is coupled to the antenna beam manager 1410 and to the base station signal processing component(s) 1412. The example base station 1400 also includes one or more network interface(s) 1416.

The antenna array 1402 includes multiple antenna elements, and is an example of a physical interface to a communication medium. The antenna elements could take any of various forms, depending on the type of communication equipment in which the components shown in FIG. 14 are implemented.

Although shown as a single element in FIG. 14, the beamformer 1404 could include separate receive and transmit beamformers. The beamformer 1404 could include gain elements and phase shift elements, for example, to apply gains and phase shifts to antenna feed signals to form different receive and transmit antenna beams in different directions.

In some embodiments, the receiver 1406 includes such components as a demodulator, an amplifier, and/or other components of an RF receive chain. The transmitter 1408 may similarly include such components as a modulator, an amplifier, and/or other components of an RF transmit chain.

The antenna beam manager 1410 is implemented using hardware, firmware, one or more components that execute software, or some combination thereof. Electronic devices that might be suitable for implementing the antenna beam manager 1410 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. These electronic devices are illustrative of circuitry that could be configured to manage antenna beams as disclosed herein. In a processor-based implementation, for example, processor-executable instructions to configure a processor to perform antenna beam management operations are stored in a non-transitory processor-readable medium, such as the memory 1414.

The signal processing component(s) 1412 could similarly be implemented using hardware, firmware, components that execute software, or combinations thereof. The number(s) and type(s) of the signal processing component(s) 1412 are implementation-dependent. Any of various types of signal processing could be applied to signals that are received by or are to be transmitted by the base station 1400.

The memory 1414 could include one or more solid-state memory devices and/or memory devices with movable and possibly removable storage media. Illustrative examples of storage media that could be used to implement the memory 1414 are provided above.

The network interface(s) 1416 could include any of various types of physical interfaces to communication media. Like the antenna array 1402, the network interface(s) 1416 could take any of various forms, depending on the type of communication equipment in which the components shown in FIG. 14 are implemented and the type of communication protocols and media that are to be supported.

Figure 15:
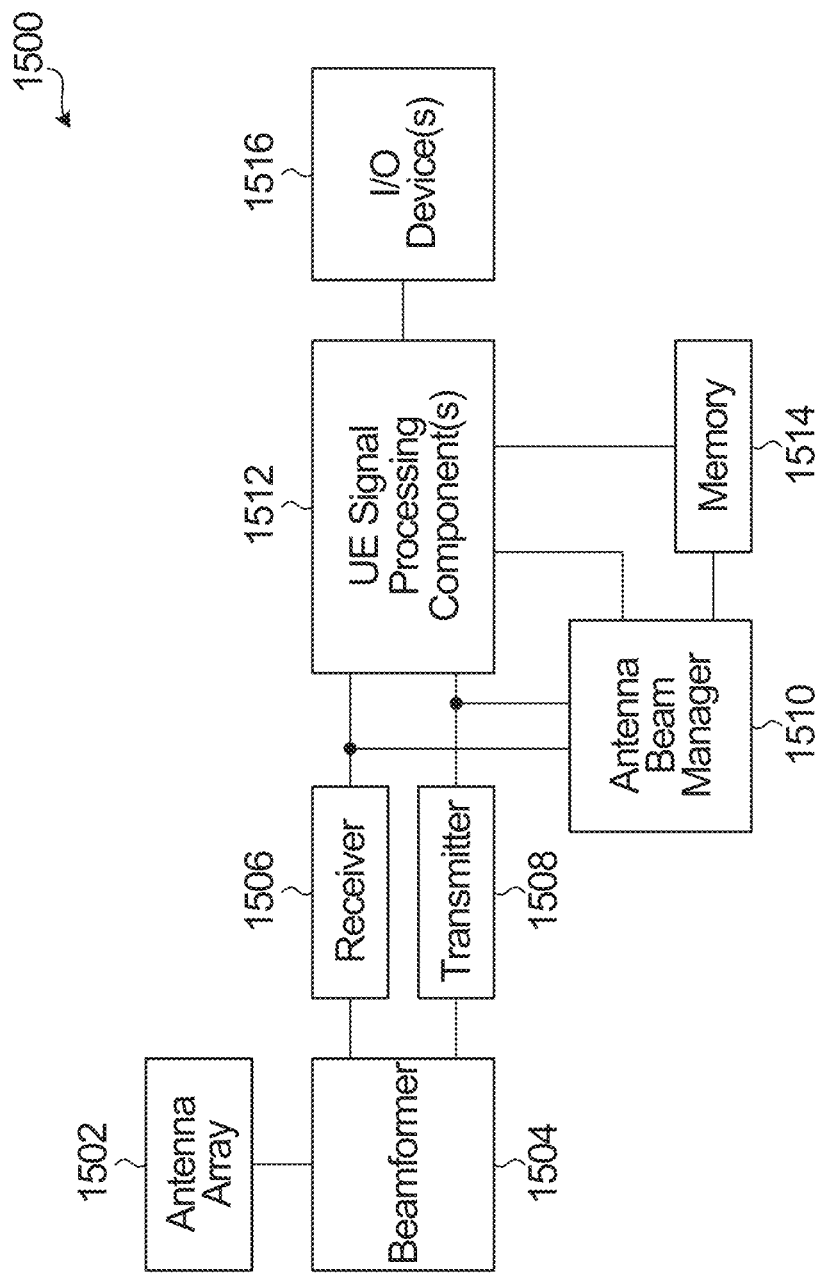
FIG. 15 is a block diagram illustrating a UE according to an embodiment.

FIG. 15 is a block diagram illustrating a UE according to an embodiment. The example UE 1500 is similar in structure to the example base station 1400 in FIG. 14, and includes an antenna array 1502, a beamformer 1504 coupled to the antenna array, a receiver 1506 and a transmitter 1508 coupled to the beamformer and to an antenna beam manager 1510, and a memory 1514 coupled to the antenna beam manager. Example implementations of these components are described above with reference to FIG. 14. Although these components in a UE could be implemented in a similar manner as in a base station, implementation details could be different between a base station and a UE. A base station, for example, could include a larger antenna array with larger and/or more antenna elements than a UE, more memory space than a UE, and/or more powerful processors than a UE to implement processor-based components.

Other UE components are generally shown as signal processing component(s) 1512, coupled to the receiver 1506, the transmitter 1508, the antenna beam manager 1510, and the memory 1514. The signal processing component(s) could be implemented using hardware, firmware, components that execute software, or a combination thereof. Examples of such implementations are described above.

The example UE 1500 includes one or more input/output (I/O) device(s) 1516, such as a display screen, which could be a touchscreen to enable user input. A separate input device such as a keyboard could also or instead be provided.

The example base station 1400 and the example UE 1500 are illustrative of communication devices in which antenna beam management could be implemented. Both the example base station 1400 and the example UE 1500 include an antenna array 1402, 1502 and a transmitter 1408, 1508 operatively coupled to the antenna array, to form antenna beams that are oriented in different directions. In the examples shown in FIGS. 14 and 15, the transmitters 1408, 1508 control the beamformers 1404, 1504 to form the antenna beams by controlling gains, phase shifts, or both, that are applied to antenna feed signals associated with the antenna elements in the antenna arrays 1402, 1502.

The example base station 1400 and the example UE 1500 also include a receiver 1406, 1506 operatively coupled to the antenna array 1402, 1502, and to an antenna beam manager 1410, 1510. The antenna beam manager 1410, 1510 is configured to determine a communication resource that is to be used for transmission of a beam sweeping signal, and that is different from a communication resource for transmission of beam sweeping signals by another communication device that is within an interference range of the communication device. The antenna beam manager 1410, 1510 is further configured to transmit the beam sweeping signal via the transmitter 1408, 1508 using the determined communication resource and the antenna beams.

Implementing these features in a base station 1400 provides for downlink beam sweeping, and implementing these features in a UE provides for uplink beam sweeping.

An antenna beam manager 1410, 1510 could be configured to monitor the receiver 1406, 1506 for receipt of an indication, from another communication device, of a direction from which that other communication device best received the beam sweeping signal. Such an indication could be an explicit indication of the direction or an implicit indication from which the direction can be determined.

Beam sweeping signal reception involves forming receive antenna beams that are oriented in different directions. In the example base station 1400 and the example UE 1500, the receivers 1406, 1506 are configured to control the beamformers 1404, 1504 to form the receive beams. Either or both of the antenna beam managers 1410, 1510 could be configured to monitor the receive antenna beams and receive beam sweeping signals from other communication devices in different communication resources, and to determine, for each communication device from which a beam sweeping signal is received, and based on the different communication resources, a direction from which the received beam sweeping signal is best received. The antenna beam manager 1410, 1510 could be further configured to determine a transmit direction in which each received beam sweeping signal was transmitted, and to transmit to each communication device an explicit or implicit indication of the determined transmit direction for that communication device.

After initial beam training, an antenna beam manager 1410, 1510 could be further configured to perform beam tracking to track movement of a UE. Beam tracking could involve downlink beam sweeping by the base station antenna beam manager 1410 or uplink beam sweeping by the UE antenna beam manager 1510.

In some embodiments, antenna beam indices are used in beam management. Either or both of the antenna beam managers 1410, 1510 could be configured to store to antenna beam indices to the memory 1414, 1514. Antenna beam directions, UE identifiers, TRP identifiers, and/or other forms of connection identifiers could also or instead be stored to the memory 1414, 1514.

Figure 16:
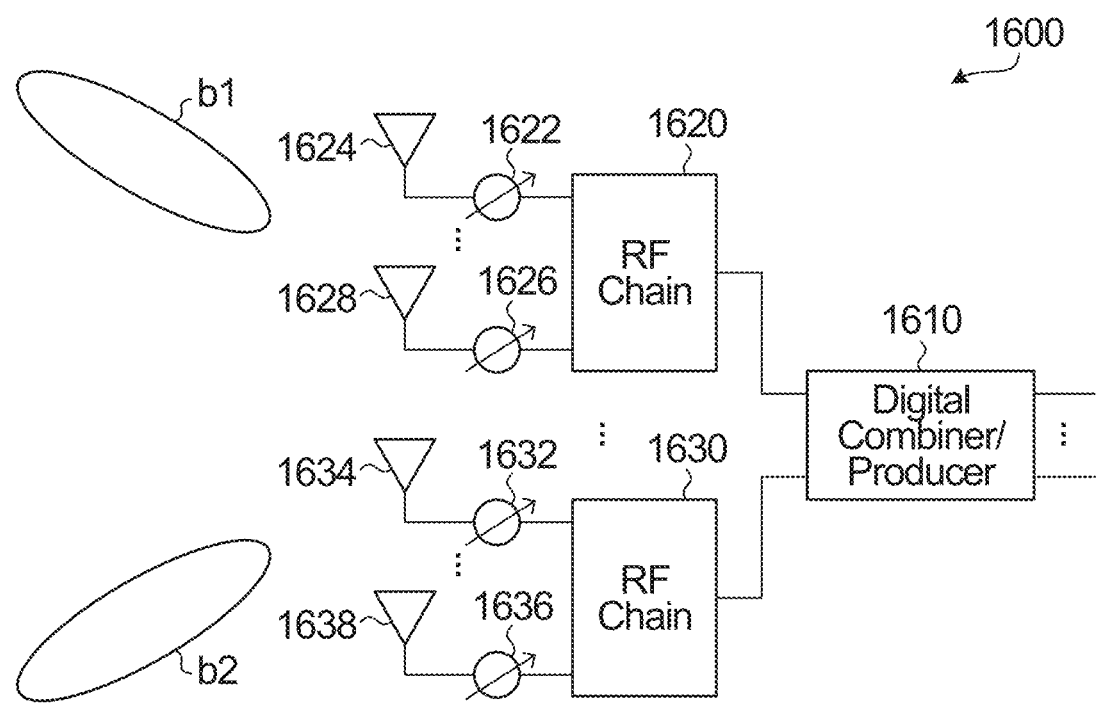
FIG. 16 is a block diagram illustrating a communication device with multiple Radio Frequency (RF) chains.

FIG. 16 is a block diagram illustrating a communication device with multiple RF chains. Base stations, UEs, or both, could include multiple RF chains. The example communication device 1600 includes a digital combiner/precoder 1610, multiple RF chains 1620, 1630, and multiple antennas 1624, 1628 and 1634, 1638 coupled to the RF chains through phase controllers 1622, 1626 and 1632, 1636.

The example communication device 1600 could be implemented as the antenna array, beamformer, receiver, and transmitter in either of both of FIGS. 13 and 15, for example. A receiver-only implementation of the example communication device 1600 could include a combiner, and a transmitter-only implementation could include a precoder, instead of the combiner/precoder 1610.

Two RF chains 1620, 1630 and associated phase controllers 1622/1626, 1632/1636 and antennas 1624-1626, 1634/1636 are shown in FIG. 16 by way of example. In this embodiment, two antenna beams b1, b2 can be formed simultaneously. Other embodiments could include more RF chains and associated components to form more than two antenna beams.

A base station such as a TRP could include multiple RF chains to enable simultaneous transmission/reception of signals over multiple antenna beams in multiple directions during beam sweeping, for example. Multiple TRP RF chains could also or instead be used for simultaneous communications with multiple UEs.

A UE that includes multiple RF chains may monitor multiple antenna beams simultaneously for signals from base stations, and/or simultaneously transmit signals over multiple antenna beams in multiple directions during beam sweeping.

For a UE implementation, consider an example in which a UE is connected to multiple TRPs, but can be scheduled by only one TRP at a time. In Dynamic Point Selection (DPS) of centralized Coordinated Multi-Point (CoMP), for example, because of channel hardening under massive Multiple Input Multiple Output (mMIMO), UE scheduling at a TRP becomes wideband, and a UE can only be scheduled by one TRP at a time. In this case, a UE could include only one RF chain to form all antenna beams, in one direction at a time. A UE that includes multiple RF chains could use any one of the multiple RF chains to form one antenna beam at a time, or more than one RF chain could be used to simultaneously form more than one antenna beam in the same direction.

In UE-centric distributed CoMP, for example, UE scheduling at each TRP is independent, and therefore a UE that is connected to multiple TRPs could be scheduled by multiple TRPs at a time. A UE that has at least as many RF chains as TRP connections may simultaneously receive downlink data transmissions from multiple TRPs, by forming multiple antenna beams for the TRP connections using different RF chains.

What has been described is merely illustrative of the application of principles of embodiments of the present disclosure. Other arrangements and methods can be implemented by those skilled in the art.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more base stations than shown, or that have different topologies than the example shown. Similarly, the examples in the other drawings are also intended solely for illustrative purposes.

In addition, although described primarily in the context of methods and systems, other implementations are also contemplated, as instructions stored on a non-transitory processor-readable medium, for example. The instructions, when executed by one or more processors, cause the one or more processors to perform a method.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

The present disclosure encompasses, among others, embodiments in which a method involves: receiving at a communication device, using a plurality of antenna beams that are oriented in a plurality of directions, a first beam sweeping signal from a first transmitting communication device in a first communication resource and a second beam sweeping signal from a second transmitting communication device in a second communication resource that is different from the first communication resource; determining, based on the first communication resource, a first direction of the first beam sweeping signal; and determining, based on the second communication resource, a second direction of the second beam sweeping signal. For example, the first direction could be a direction of the plurality of directions from which the first beam sweeping signal is best received from the first transmitting communication device, and the second direction could be a direction of the plurality of directions from which the second beam sweeping signal is best received from the second transmitting communication device.

Such a method could also include determining, based on the first communication resource, a first transmit direction in which the first beam sweeping signal was transmitted by the first transmitting communication device; determining, based on the second communication resource, a second transmit direction in which the second beam sweeping signal was transmitted by the second transmitting communication device; and transmitting an indication of the first transmit direction to the first transmitting communication device and an indication of the second transmit direction to the second transmitting communication device.

The first indication could be an explicit indication of the first transmit direction, and the second indication could be an explicit indication of the second transmit direction. In another embodiment, the first indication is an implicit indication from which the first transmitting communication device determines the first transmit direction, and the second indication is an implicit indication from which the second transmitting communication device determines the second transmit direction.

The communication device is a UE in some embodiments, and a method could include transmitting a third beam tracking signal from the UE using the plurality of antenna beams; and monitoring, at the UE, for receipt of an indication, from a base station, of a further direction of the plurality of directions from which the base station best received the third beam tracking signal from the UE. The method could also involve, before transmitting the third beam tracking signal from the UE: monitoring, at the UE, for receipt of a signal, from the base station, to cause the UE to initiate a beam sweeping procedure that comprises transmitting the third beam tracking signal from the UE and monitoring for receipt of the indication of the further direction from the base station.

A non-transitory processor-readable medium could be used to store instructions which, when executed by one or more processors, cause the one or more processors to perform a method that involves: receiving at a communication device, using a plurality of antenna beams that are oriented in a plurality of directions, a first beam sweeping signal from a first transmitting communication device in a first communication resource and a second beam sweeping signal from a second transmitting communication device in a second communication resource that is different from the first communication resource; determining, based on the first communication resource, a first direction of the plurality of directions from which the first beam sweeping signal is best received from the first transmitting communication device; and determining, based on the second communication resource, a second direction of the plurality of directions from which the second beam sweeping signal is best received from the second transmitting communication device.

A further embodiment relates to a communication device that includes: an antenna array; a transmitter, operatively coupled to the antenna array; a receiver operatively coupled to the antenna array, to form a plurality of antenna beams that are oriented in a plurality of directions; and an antenna beam manager, operatively coupled to the transmitter and to the receiver, to: receive, using the plurality of antenna beams, a first beam sweeping signal from a first transmitting communication device in a first communication resource and a second beam sweeping signal from a second transmitting communication device in a second communication resource that is different from the first communication resource; determine, based on the first communication resource, a first direction of the first beam sweeping signal; and determine, based on the second communication resource, a second direction of the second beam sweeping signal. As described above, the first direction could be a direction of the plurality of directions from which the first beam sweeping signal is best received from the first transmitting communication device, and the second direction could be a direction of the plurality of directions from which the second beam sweeping signal is best received from the second transmitting communication device.

The communication device could be implemented as a UE, and the first transmitting communication device and the second transmitting communication could be base stations.

The antenna beam manager is further configured, in some embodiments to: determine, based on the first communication resource, a first transmit direction in which the first beam sweeping signal was transmitted by the first transmitting communication device; determine, based on the second communication resource, a second transmit direction in which the second beam sweeping signal was transmitted by the second transmitting communication device; and transmit via the transmitter an indication of the first transmit direction to the first transmitting communication device and an indication of the second transmit direction to the second transmitting communication device.

The first indication could be an explicit indication of the first transmit direction, and the second indication could be an explicit indication of the second transmit direction. In another embodiment, the first indication is an implicit indication from which the first transmitting communication device determines the first transmit direction, and the second indication is an implicit indication from which the second transmitting communication device determines the second transmit direction.

The antenna beam manager could be further configured to perform beam tracking to track movement of the UE.

The communication device could include: memory, operatively coupled to the antenna beam manager, and the antenna beam manager could be further configured to store to the memory a first beam index associated with the first direction and a second beam index associated with the second direction.

We claim:

1. A method comprising:
    determining a first communication resource to be used for transmission of a first beam sweeping signal by a first communication device, the first communication resource being different from a second communication resource for transmission of a second beam sweeping signal by a second communication device that is within a coverage area of the first communication device;
    transmitting, by the first communication device, the first beam sweeping signal in a plurality of directions using the first communication resource and a plurality of antenna beams that are oriented in the plurality of directions;
    monitoring, at the first communication device, for a response from a third communication device that receives the first beam sweeping signal and determining one direction of the plurality of directions from which the third communication device best received the first beam sweeping signal based on a timing of receipt of the response from the third communication device;
    transmitting, by the first communication device using a first antenna beam of the plurality of antenna beams oriented in the one direction, control signaling specifying a transmission pattern for transmission of data; and
    transmitting, by the first communication device to the second communication device, further control signaling specifying the transmission pattern,
    wherein the transmission pattern comprises a pattern for transmission of data using multiple antenna beams comprising the first antenna beam that is oriented in the one direction and a second antenna beam that is oriented in a second direction from which the third communication device best received the second beam sweeping signal from the second communication device.

2. The method of claim 1, further comprising:
    establishing a connection with the third communication device via the first antenna beam.

3. The method of claim 2, wherein the first communication device comprises a base station and the third communication device comprises User Equipment (UE), the method further comprising:
    repeating the transmitting and the monitoring to track movement of the UE.

4. The method of claim 2, wherein the first communication device comprises a base station and the third communication device comprises User Equipment (UE), the method further comprising:

monitoring, at the base station, the plurality of antenna beams for receipt of a beam tracking signal from the UE; and transmitting to the UE an indication of a further direction from which the base station best received the beam tracking signal from the UE.

5. The method of claim 4, further comprising, before monitoring the plurality of antenna beams for receipt of the beam tracking signal from the UE:

transmitting to the UE a signal to cause the UE to initiate a beam tracking procedure that comprises transmitting the beam tracking signal from the UE and monitoring at the UE for receipt of the indication of the further direction from the base station.

6. The method of claim 1, wherein the first communication resource and the second communication resource are orthogonal communication resources.

7. The method of claim 1, wherein the first communication resource and the second communication resource are each time division multiplexed communication resources, are each frequency division multiplexed communication resources, or are each code division multiplexed communication resources.

8. The method of claim 1, wherein the transmitting comprises sequentially transmitting the first beam sweeping signal in the plurality of directions.

9. The method of claim 1, wherein the control signaling includes a pattern index specifying the transmission pattern for transmission of data.

10. The method of claim 1, further comprising transmitting data in the one direction in accordance with the transmission pattern.

11. A non-transitory processor-readable medium storing instructions which, when executed by one or more processors, cause the one or more processors to perform a method comprising:

determining a first communication resource to be used for transmission of a first beam sweeping signal by a first communication device, the first communication resource being different from a second communication resource for transmission of a second beam sweeping signal by a second communication device that is within a coverage area of the first communication device;

transmitting, by the first communication device, the first beam sweeping signal in a plurality of directions using the first communication resource and a plurality of antenna beams that are oriented in the plurality of directions;

monitoring, at the first communication device, for a response from a third communication device that receives the first beam sweeping signal, and determining one direction of the plurality of directions from which the third communication device best received the first beam sweeping signal based on a timing of receipt of the response from the third communication device;

transmitting, by the first communication device using a first antenna beam of the plurality of antenna beams oriented in the one direction, control signaling specifying a transmission pattern for transmission of data; and transmitting, by the first communication device to the second communication device, further control signaling specifying the transmission pattern, wherein the transmission pattern comprises a pattern for transmission of data using multiple antenna beams comprising the first antenna beam that is oriented in the one direction and a second antenna beam that is oriented in a second direction from which the third communication device best received the second beam sweeping signal from the second communication device.

12. The non-transitory processor-readable medium of claim 11, wherein the transmitting comprises sequentially transmitting the first beam sweeping signal in the plurality of directions.

13. The non-transitory processor-readable medium of claim 11, wherein the control signaling includes a pattern index specifying the transmission pattern for transmission of data.

14. The non-transitory processor-readable medium of claim 11, the instructions further comprising instructions which, when executed by one or more processors, cause the one or more processors to transmit data in the one direction in accordance with the transmission pattern.

15. A communication device comprising:
an antenna array;
a transmitter, operatively coupled to the antenna array, to form a plurality of antenna beams that are oriented in a plurality of directions;
a receiver operatively coupled to the antenna array; and
an antenna beam manager, operatively coupled to the transmitter and to the receiver, and configured to: determine a first communication resource to be used for transmission of a first beam sweeping signal by the communication device, the first communication resource being different from a second communication resource for transmission of a second beam sweeping signal by a second communication device that is within a coverage area of the first communication device; transmit the first beam sweeping signal in the plurality of directions via the transmitter using the first communication resource and the plurality of antenna beams; monitor the receiver for a response from a third communication device that receives the first beam sweeping signal, and determining one direction of the plurality of directions from which the third communication device best received the first beam sweeping signal based on a timing of receipt of the response from the third communication device; transmit using a first antenna beam of the plurality of antenna beams oriented in the one direction, control signaling specifying a transmission pattern for transmission of data; and transmit to the second communication device, further control signaling specifying the transmission pattern, wherein the transmission pattern comprises a pattern for transmission of data using multiple antenna beams comprising the first antenna beam that is oriented in the one direction and a second antenna beam that is oriented in a second direction from which the third communication device best received the second beam sweeping signal from the second communication device.

16. The communication device of claim 15, implemented as a base station.

17. The communication device of claim 15, wherein the communication device is implemented as a base station and the third communication device comprises User Equipment (UE), and wherein the antenna beam manager is further configured to perform beam tracking to track movement of the UE.

18. The communication device of claim 15, further comprising:

memory, operatively coupled to the antenna beam manager,
wherein the antenna beam manager is further configured to store to the memory a beam index associated with the one direction.

19. The communication device of claim 15, wherein the antenna beam manager is further to sequentially transmit the first beam sweeping signal via the transmitter in the plurality of directions.

20. The communication device of claim 15, wherein the control signaling includes a pattern index specifying the transmission pattern for transmission of data.

21. The communication device of claim 15, wherein the antenna beam manager is configured to transmit data in the one direction in accordance with the transmission pattern.

* * * * *